US012742616B2

(12) United States Patent
Maurer

(10) Patent No.: US 12,742,616 B2
(45) Date of Patent: Sep. 22, 2026

(54) METHOD FOR OPERATING AN ULTRA-WIDEBAND ELECTROMAGNETIC SOURCE

(71) Applicant: DRS Training & Control Systems, LLC, Fort Walton Beach, FL (US)

(72) Inventor: Steven K. Maurer, Pensacola, FL (US)

(73) Assignee: DRS Training & Control Systems, LLC, Fort Walton Beach, FL (US)

( * ) Notice: Subject to any disclaimer, the term of this patent is extended or adjusted under 35 U.S.C. 154(b) by 180 days.

(21) Appl. No.: 18/829,026

(22) Filed: Sep. 9, 2024

(65) Prior Publication Data

US 2024/0426582 A1 Dec. 26, 2024

Related U.S. Application Data

(62) Division of application No. 17/883,287, filed on Aug. 8, 2022, now Pat. No. 12,117,272.

(60) Provisional application No. 63/231,131, filed on Aug. 9, 2021.

(51) Int. Cl.

| | |
|---|---|
| ***F41H 13/00*** | (2006.01) |
| ***H01Q 5/25*** | (2015.01) |
| ***H01Q 15/02*** | (2006.01) |
| ***H01Q 15/16*** | (2006.01) |
| ***H01Q 21/26*** | (2006.01) |

(52) U.S. Cl.

CPC ........... *F41H 13/0075* (2013.01); *H01Q 5/25* (2015.01); *H01Q 15/02* (2013.01); *H01Q 15/16* (2013.01); *H01Q 21/26* (2013.01)

(58) Field of Classification Search

None

See application file for complete search history.

(56) References Cited

U.S. PATENT DOCUMENTS

| | | | |
|---|---|---|---|
| 3,289,015 | A | 11/1966 | Fitch et al. |
| 3,456,221 | A | 7/1969 | Martin et al. |
| 4,140,917 | A | 2/1979 | Weiner |
| 4,217,468 | A | 8/1980 | Rice et al. |
| 4,484,085 | A | 11/1984 | Fallier, Jr. et al. |
| 4,507,567 | A | 3/1985 | Lawson |
| 4,608,521 | A | 8/1986 | Fallier, Jr. et al. |

(Continued)

FOREIGN PATENT DOCUMENTS

| | | | |
|---|---|---|---|
| WO | 9619637 | A1 | 6/1996 |

OTHER PUBLICATIONS

U.S. Appl. No. 17/883,287 , Notice of Allowance, Mailed On Jun. 17, 2024, 9 pages.

(Continued)

*Primary Examiner* — Whitney Moore

(74) *Attorney, Agent, or Firm* — Kilpatrick Townsend & Stockton LLP

(57) ABSTRACT

A method of generating an ultra-wideband electromagnetic pulse includes initiating a voltage source, producing a voltage pulse using the voltage source, and receiving the voltage pulse at a bipolar vector inversion generator (VIG) assembly. The method also includes compressing and amplifying the voltage pulse using the bipolar VIG assembly to produce a compressed, differential voltage pulse, further compressing the compressed, differential voltage pulse using a peaking gap assembly to produce a balanced peak pulse, applying the balanced peak pulse to one or more sets of antenna arms, and radiating the ultra-wideband electromagnetic pulse using an antenna assembly.

9 Claims, 21 Drawing Sheets

(56) References Cited

U.S. PATENT DOCUMENTS

| | | | |
|---|---|---|---|
| 4,717,834 | A | 1/1988 | Levy |
| 5,325,105 | A | 6/1994 | Cermignani et al. |
| 5,567,995 | A | 10/1996 | O'Loughlin et al. |
| 5,880,699 | A | 3/1999 | McCorkle |
| 5,959,591 | A | 9/1999 | Aurand |
| 6,340,956 | B1 | 1/2002 | Bowen et al. |
| 7,151,330 | B2 | 12/2006 | Rose |
| 7,633,182 | B2 | 12/2009 | London |
| 7,986,060 | B2 | 7/2011 | London |
| 10,123,217 | B1 | 11/2018 | Barzegar et al. |
| 10,135,364 | B2 | 11/2018 | Roberts et al. |
| 10,695,127 | B2 | 6/2020 | Nuccitelli et al. |
| 2003/0011525 | A1 | 1/2003 | Sanad |
| 2006/0238034 | A1 | 10/2006 | Rose |
| 2011/0006614 | A1 | 1/2011 | Baird et al. |
| 2015/0097466 | A1 | 4/2015 | Roberts et al. |

OTHER PUBLICATIONS

Agee et al., "Ultra-Wideband Transmitter Research", IEEE Transactions on Plasma Science, vol. 26, No. 3, Jun. 1998, pp. 860-873.
Baum , "Configurations of TEM Feed for an IRA", Sensor and Simulation Notes, Note 327, Apr. 27, 1991, 21 pages.
Baum et al., "Impulse Radiating Antennas", Ultra-Wideband, Short-Pulse Electromagnetics, Plenum Press, 1993, pp. 139-147.
Baum et al., "Jolt: A Highly Directive, Very Intensive, Impulse-Like Radiator", Air Force Research Laboratory, Directed Energy Directorate (AFRL-DE-PS-TR-2006-1073), May 1, 2006, 44 pages.
Baum et al., "Review of Impulse-Radiating Antennas", Review of Radio Science, Oxford University Press, 1999, pp. 403-439.
Bowen et al., "A High-Voltage Cable-Fed Impulse Radiating Antenna", Sensor and Simulation Notes, Note 507, Dec. 2005, pp. 1-14.
Bowen et al., "A Prototype High-Voltage UWB Transmitter", Sensor and Simulation Notes, Note 473, Mar. 2003, pp. 1-20.
Bulos et al., "Streamer Chamber Development", Stanford Linear Accelerator Center (SLAC) Report No. 74, Jun. 1967, 158 pages.
Farr et al., "Development of a Reflector IRA and a Solid Dielectric Lens IRA, Part I: Design, Predictions, and Construction", Sensor and Simulation Notes, Note 396, Apr. 1996, 52 pages.
Farr et al., "Impulse Radiating Antennas, Part II", Ultra-Wideband, Short-Pulse Electromagnetics 2, Plenum Press, 1995, pp. 159-170.
Farr et al., "Impulse Radiating Antennas, Part III", Ultra-Wideband, Short-Pulse Electromagnetics 3, Plenum Press, 1997, pp. 43-56.
Farr et al., "Multi-Channel Impulse Radiating Antennas with Polarization Diversity", Air Force Research Laboratory, Directed Energy Directorate (AFRL-DE-TR-1999-1019), Jan. 1999, 31 pages.
Fitch et al., "Novel Principle of Transient High-Voltage Generation", Proceedings of the Institution of Electrical Engineer, vol. 111, No. 4, Apr. 1964, pp. 849-855.
Giri et al., "A Reflector Antenna for Radiating Impulse-Like Waveforms", Sensor and Simulation Notes, Note 382, Jul. 4, 1995, 20 pages.
Giri et al., "Design, Fabrication, and Testing of a Paraboloidal Reflector Antenna and Pulser System for Impulse-Like Waveforms", IEEE Transactions on Plasma Science, vol. 25, No. 2, Apr. 1997, pp. 318-326.
Giri et al., "High-Power Electromagnetic Effects on Electronic Systems", Artech House, 2020, pp. 51-54.
Giri et al., "High-Power Electromagnetic Radiators, Nonlethal Weapons and Other Applications", Harvard University Press, Dec. 7, 2004, pp. 117-136.
Giri et al., "HPEM Environment Capabilities at Armisuisse in Switzerland", Sensor and Simulation Notes, Note 580, Oct. 25, 2018, 31 pages.
Giri et al., "Reflector IRA Design and Boresight Temporal Waveforms", Sensor and Simulation Notes, Note 365, Feb. 2, 1994, 36 pages.
Holt et al., "A Marx Generator Driven Impulse Radiating Antenna", IEEE Pulsed Power Conference, Jun. 28-Jul. 2, 2009, 6 pages.
Korovin et al., "Repetitive Nanosecond High-Voltage Generator Based on Spiral Forming Line", PPPS-2001 Pulsed Power Plasma Science 2001. 28th IEEE International Conference on Plasma Science and 13th IEEE International Pulsed Power Conference. Digest of Papers, 2002, pp. 1249-1251.
Merryman et al., "Characterization and Applications of Vector Inversion Generators", Digest of Technical Papers. PPC-2003. 14th IEEE International Pulsed Power Conference, Jun. 15-18, 2003, pp. 249-252.
Application No. PCT/US2022/039749 , International Search Report and the Written Opinion, Mailed On Nov. 14, 2022, 8 pages.
Pelletier et al., "Experiments Involving a Spiral Generator used as a Transient High Voltage Generator", IEEE Twenty-First International Power Modulator Symposium, Jun. 27-30, 1994, pp. 232-235.
Petrella , "Non-Invasive Picosecond Pulse System for Electrostimulation", ODU Digital Commons, Available online at: https://digitalcommons.odu.edu/cgi/viewcontent.cgi?article=1029&context=ece_etds, May 2018, 123 pages.
Prather et al., "Recent Developments in Ultra-wideband Sources and Antennas", Ultra-wideband, Short-Pulse Electromagnetics 5, Kluwer Academic/Plenum Publishers, 2002, pp. 393-397.
Prather et al., "Survey of Worldwide High-Power Wideband Capabilities", IEEE Transactions on Electromagnetic Compatibility, vol. 46, No. 3, Aug. 2004, pp. 335-344.
Prather et al., "Ultra-Wideband Source and Antenna Research", IEEE Transactions on Plasma Science, vol. 28, No. 5, Oct. 2000, pp. 1624-1630.
Prather et al., "Ultra-Wideband Sources and Antennas", Ultra-Wideband Short-Pulse Electromagnetics 4, Jun. 14-19, 1999, pp. 119-130.
Ramrus et al., "High-Voltage Spiral Generators", Maxwell Laboratories / Naval Surface Weapons Center, Dahlgren Laboratory, Nov. 1976, pp. 1-6.
Rose et al., "High Efficiency Compact High Voltage Vector Inversion Generators", IEEE Pulsed Power Conference, Jun. 13-15, 2005, pp. 1207-1210.
Rose et al., "Pulsed Energy Systems for Generating Plasmas", American Institute of Aeronautics and Astronautics, PDL-6: Space Plasma Propulsion II Session, Jun. 19, 2012, pp. 1-11.
Shotts et al., "Design Principles for Vector Inversion Generators", 2007 IEEE 34th International Conference on Plasma Science (ICOPS), Jun. 17-22, 2007, pp. 556-559.
Smith et al., "Design, Fabrication and Testing of a Paraboloidal Reflector Antenna and Pulser System for Impulse-Like Waveforms", Digest of Technical Papers. Tenth IEEE International Pulsed Power Conference, Jul. 3-6, 1995, pp. 56-64.

METHOD FOR OPERATING AN ULTRA-WIDEBAND ELECTROMAGNETIC SOURCE

CROSS-REFERENCES TO RELATED APPLICATIONS

This application is a divisional of U.S. patent application Ser. No. 17/883,287, filed on Aug. 8, 2022, which claims priority to U.S. Provisional Patent Application No. 63/231,131, filed on Aug. 9, 2021, entitled "Method and System for Ultra-Wideband Electromagnetic Source," the disclosures of which are hereby incorporated by reference in their entirety for all purposes.

BACKGROUND OF THE INVENTION

Unmanned aircraft systems, also known as drones, have been used for a variety of applications, including photography, surveillance, and the like. Military drones may perform reconnaissance missions or carry payloads during military operations.

Small unmanned aircraft systems, or drones, because of their low cost and widespread availability, present safety and security risks to military operations. A variety of approaches have been developed to intercept, disable, or destroy drones. However, there is a need in the art for improved methods and systems related to interdiction, disabling, and/or destruction of military drones and militarized commercial drones.

SUMMARY OF THE INVENTION

The present disclosure relates generally to methods and systems related to electromagnetic sources. More particularly, embodiments of the present invention provide methods and systems for the generation of an ultra-wideband (UWB) high-power electromagnetic (HPEM) source. The UWB electromagnetic source described herein can be utilized in a variety of different applications, including as a Counter small Unmanned Aircraft System (C-sUAS) and Counter Unmanned Aircraft System (C-UAS) directed energy weapon (DEW) that may be integrated into a mobile vehicle platform, trailer platform, or dismounted/tripod platform for ground troops. The disclosure is applicable to a variety of applications in military and civilian electronic systems.

According to an embodiment of the present invention, an ultra-wideband electromagnetic source is provided. The ultra-wideband electromagnetic source includes a voltage source and a pulser assembly electrically coupled to the voltage source. The pulser assembly includes a bipolar vector inversion generator (VIG) assembly, a peaking gap assembly coupled to the VIG assembly, and an oil lens assembly coupled to the peaking gap assembly. The ultra-wideband electromagnetic source also includes a balanced antenna assembly including one or more sets of antenna arms coupled to the oil lens assembly and an antenna reflector coupled to the one or more sets of antenna arms.

The pulser assembly can be positioned in front of and integrated with the balanced antenna assembly. The bipolar VIG assembly can include a first VIG and a second VIG. The peaking gap assembly can include two overvoltage gaps or a single overvoltage gap. The one or more sets of antenna arms can consist of two sets of antenna arms, with each set of antenna arms consisting of two antenna arms. The two antenna arms can originate within the oil lens assembly and protrude through a surface of the oil lens assembly. The ultra-wideband electromagnetic source is characterized by a predetermined low frequency cutoff. The predetermined low frequency cutoff is defined by a length of a highly conductive portion of the two antenna arms. A length of each of the two antenna arms can be defined by the highly conductive portion and a resistive termination section. The bipolar VIG assembly can be positioned farthest from the antenna reflector and the oil lens assembly can be positioned closest to the antenna reflector.

According to another embodiment of the present invention, a method of generating an ultra-wideband electromagnetic pulse is provided. The method includes initiating a voltage source, producing a voltage pulse using the voltage source, and receiving the voltage pulse at a bipolar vector inversion generator (VIG) assembly. The method also includes compressing and amplifying the voltage pulse using the bipolar VIG assembly to produce a compressed, differential voltage pulse, further compressing the compressed, differential voltage pulse using a peaking gap assembly to produce a balanced peak pulse, and applying the balanced peak pulse to one or more sets of antenna arms. The method further includes radiating the ultra-wideband electromagnetic pulse using an antenna assembly.

The one or more sets of antenna arms can consist of two sets of antenna arms, each set of antenna arms consisting of two antenna arms. Each of the two antenna arms can include a highly conductive section and a resistive section. A length of the highly conductive section can correspond to a low frequency cutoff value for one or more sets of antenna arms. The compressed, differential voltage pulse can have a higher amplitude than the voltage pulse and the balanced peak pulse can have a higher rate of rise than the compressed, differential voltage pulse. The bipolar VIG assembly and the peaking gap assembly can be positioned in front of an antenna reflector of the antenna assembly. The bipolar VIG assembly can include a first VIG and a second VIG. The peaking gap assembly can include two overvoltage gaps or a single overvoltage gap. The peaking gap assembly can be positioned closer to an antenna reflector of the antenna assembly than the bipolar VIG assembly.

Numerous benefits are achieved by way of the present invention over conventional techniques. For example, embodiments of the present invention utilize innovative technology to provide a high effectivity system that is characterized by reduced size, weight, power and cost (SWaP-C); provide an ergonomic and safety cognizant interface; and are aligned with requirements for weapon systems. Additionally, embodiments of the present invention provide the ability to couple with heterogeneous and unknown targets in a manner that provides rapid responsiveness to threats, including fast set-up and power-up times. Moreover, additional uses for embodiments of the present invention include use as a phase coherent ultra-wideband (UWB) electromagnetic source for UWB radar applications or as an ultra-wideband, high-power electromagnetic (HPEM) source for electronics susceptibility testing. These and other embodiments of the disclosure, along with many of its advantages and features, are described in more detail in conjunction with the text below and corresponding figures.

DETAILED DESCRIPTION OF THE INVENTION

The present disclosure relates generally to methods and systems related to electromagnetic sources. More particularly, embodiments of the present invention provide methods and systems for the generation of an ultra-wideband (UWB) high-power electromagnetic (HPEM) source. The UWB HPEM source described herein may be referred to as Specialized Portable Electromagnetic Attack Radiator (SPEAR™) and can be utilized in a variety of different applications, including as a Counter small Unmanned Aircraft System (C-sUAS) and Counter Unmanned Aircraft System (C-UAS) Directed Energy Weapon (DEW) that may be integrated into a mobile vehicle platform, trailer platform, or dismounted/tripod platform for ground troops. The disclosure is applicable to a variety of applications in military and civilian electronic systems.

Embodiments of the present invention provide an intentional, single-pulse to repetition rate, integrated High Power Electromagnetic (HPEM) source and radiator. As described herein, embodiments provide a portable, compact, field deployable HPEM source that may be used as a Directed Energy Weapon (DEW) against individual and swarm drone threats as a Counter small Unmanned Aircraft System (C-sUAS) or a Counter Unmanned Aircraft System (C-UAS). The systems described herein may also be effectively used as a DEW against other equipment containing susceptible electronics, including (but not limited to) communications equipment, computer equipment, and land and marine vehicles. It may alternatively be used as a phase coherent ultra-wideband (UWB) impulse source for ultra-wideband radar or as an ultra-wideband, high-power RF source for electronics susceptibility testing. Due to characteristics including portable size, low weight, low power requirements, and effectivity, embodiments of the present invention provide C-sUAS/C-UAS capability to ground vehicles, fixed platforms, and/or field troops. In contrast with embodiments of the present invention, existing high-power microwave (HPM)-based and HPEM-based DEW systems that are used for C-sUAS/C-UAS are quite large, require more setup time and start-up time, and also are less efficient, requiring higher input power requirements. As a result, embodiments of the present invention are more cost effective than existing HPM-based and HPEM-based DEW systems with similar capabilities. Thus, embodiments of the present invention provide a portable, more compact DEW system capable of addressing swarms of drones and a solution that may be readily used in situations where the system needs to be: a) set-up quickly, b) started quickly, and c) as portable and lightweight as possible.

Figure 1A:
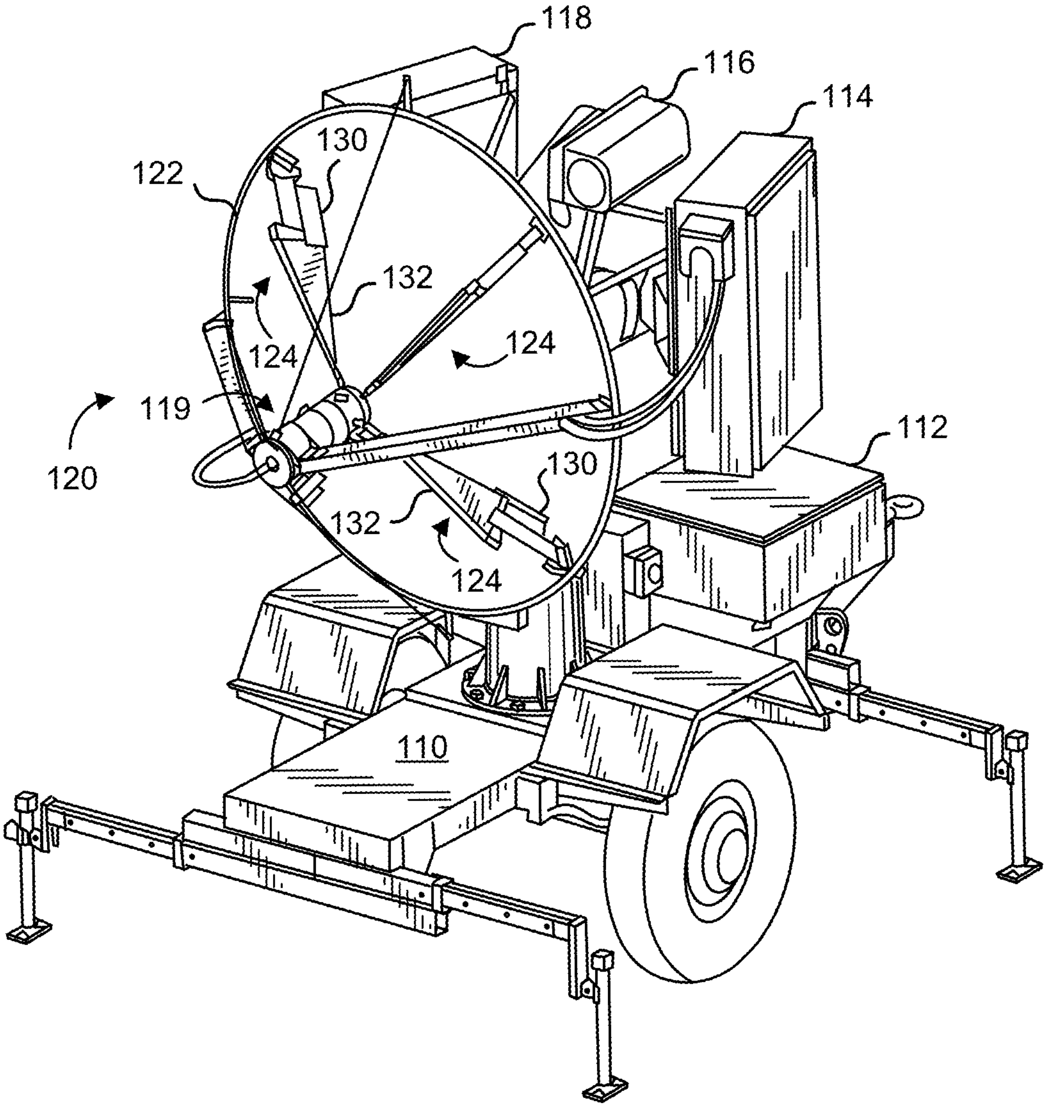
FIG. 1A is a perspective view of an electromagnetic source mounted on a portable platform according to an embodiment of the present invention.

FIG. 1A is a perspective view of an electromagnetic source according to an embodiment of the present invention. As illustrated in FIG. 1A, embodiments of the present invention utilize a pulser source that is an integral part of the antenna itself. Accordingly, a High Power Electromagnetic (HPEM) pulser source is provided that utilizes a bipolar (differential) Vector Inversion Generator (VIG) and a peaking gap as the electromagnetic or Radio Frequency (RF) source to directly drive a balanced antenna. The peaking gap assembly increases the rate of rise of the electromagnetic pulse signal that is provided to the antenna arms. The use of the described HPEM pulser source eliminates the use of high power vacuum tube devices as the RF source, providing a much more energy efficient solution that is also more compact. Being more efficient than a solid-state amplifier or vacuum tube source makes battery-powered operation possible. As the output of this novel, differential HPEM pulser source can directly drive the balanced antenna, it greatly reduces the volumetric space required as opposed to other systems that would require a sizeable ultra-wideband (UWB) Balanced-to-Unbalanced (BALUN) transformer.

Utilizing a balanced (differential vs. single-ended) source and a balanced antenna, power throughput to the antenna is more efficient and the antenna provides higher output levels than could be achieved normally since RF losses that would normally occur in the RF transmission line between the pulser and the antenna are reduced. In addition, utilizing a balanced (differential) pulser source with a balanced antenna, and collocating the pulser source with the antenna provides high signal fidelity as appropriate to properly drive the UWB antenna input. The upper frequency spectrum content generated by the UWB electromagnetic source greatly benefits from this configuration, and the system's effective upper frequency limit is increased as described more fully below in relation to FIG. 7.

As described herein, embodiments of the present invention achieve reduced size, weight, power, and cost (SWaP-C) advantages over competitor systems. Moreover, no x-ray hazards to personnel are present, as would be associated with a vacuum tube-based RF source. Additionally, much faster start-up times are achieved than may be obtained with vacuum tube-based RF sources or other high power RF sources that require vacuum waveguides. The lack of a vacuum tube eliminates vacuum tube filament warm-up time. The lack of a high power-capable vacuum waveguide eliminates necessary vacuum pump-down time associated with getting the waveguide pumped down to an acceptable vacuum level before use.

Referring to FIG. 1A, the UWB high power electromagnetic source implemented within a system includes a mobile platform 110 such as a M103A1 trailer chassis that supports the system elements, which include a control electronics assembly 112, the main controller assembly 114, a high definition infrared camera 116, the high voltage controller 118 (i.e., the high voltage power supply assembly), pulser assembly 119, and the antenna assembly 120, including an antenna reflector 122.

The UWB high power electromagnetic source system illustrated in FIG. 1A provides high effectivity, i.e., destruction of an sUAS at distances on the order of hundreds of meters to 1 km, (i.e., electric field intensities on the order of tens of kV/m) and defeat of an sUAS at distances on the order of one to several kilometers, (i.e., electric field intensities on the order of up to several kV/m). This high effectivity is achieved with a controlled beam pattern and low collateral effects. The system can be small, for example, 20"×20"×12" with a 6.5' diameter antenna, and rapidly deployed since it is easily transportable and can be set up in minutes and powered up in seconds. Low power input, for example, ~500 W with a 10 Hz pulse rate may be used, making the system operable using 28 VDC or 115 VAC, operating at frequencies ranging from 60 to 400 Hz. Significantly, the systems described herein provide deep magazine depth with a low cost per shot.

As illustrated in FIG. 1A, antenna assembly 120 includes one or more sets of antenna arms. In the illustrated embodiment, two sets of antenna arms, each including two antenna arms 124, are utilized. Each of antenna arms 124 includes a resistive section 130 and a highly conductive (e.g., metallic) section 132. As discussed more fully in relation to FIGS. 1D and 1E, the length of the highly conductive section 132 of each antenna arm 124 can be increased or decreased in conjunction with a corresponding decrease or increase of the length of the resistive section 130 in order to modify the low frequency cutoff value of antenna assembly 120. In some embodiments, the overall length of antenna arms 124 is conserved while the lengths of resistive section 130 and highly conductive section 132 are varied. In some embodiments, resistive section 130 is fabricated using resistive elements, whereas in other embodiments, it is fabricated using bulk resistive materials. One of ordinary skill in the art would recognize many variations, modifications, and alternatives.

Figure 1B:
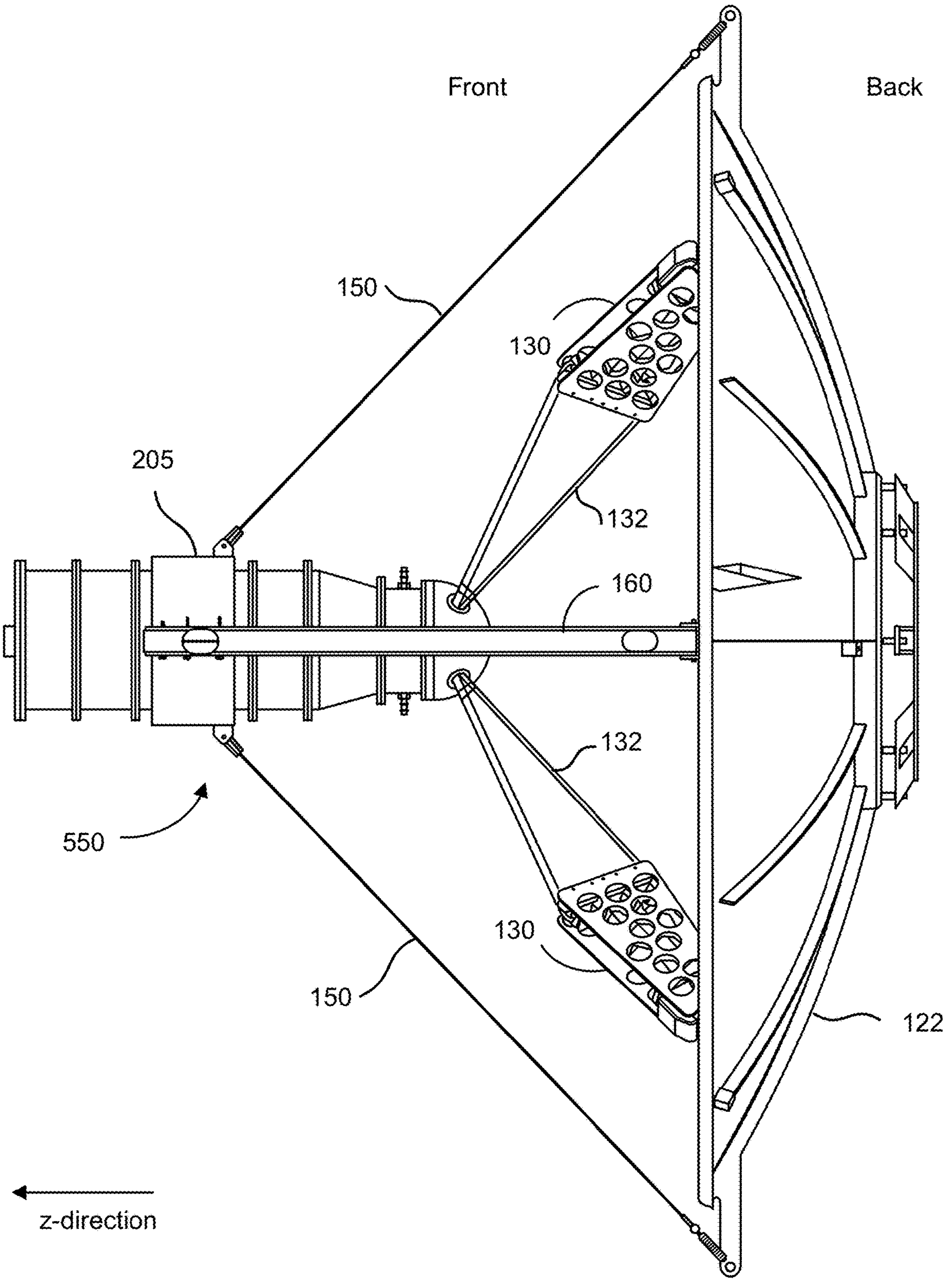
FIG. 1B is a side view of a pulse assembly and an antenna assembly according to an embodiment of the present invention.

FIG. 1B is a side view of a pulser assembly and an antenna assembly according to an embodiment of the present invention. Referring to FIG. 1B, pulser assembly 550, described more fully in relation to FIG. 5B, is mechanically connected to antenna reflector 122 using two guy wires 150 and two conduits, with conduit 160 illustrated in this view. Mounting collar 205 is utilized to attach the guy wires and conduits to pulser assembly 550. As described herein, the mounting of pulser assembly 550 and the antenna arm assemblies to antenna reflector 122 enables the generation and radiation of ultra-wideband energy useful for a variety of applications.

Figure 1C:
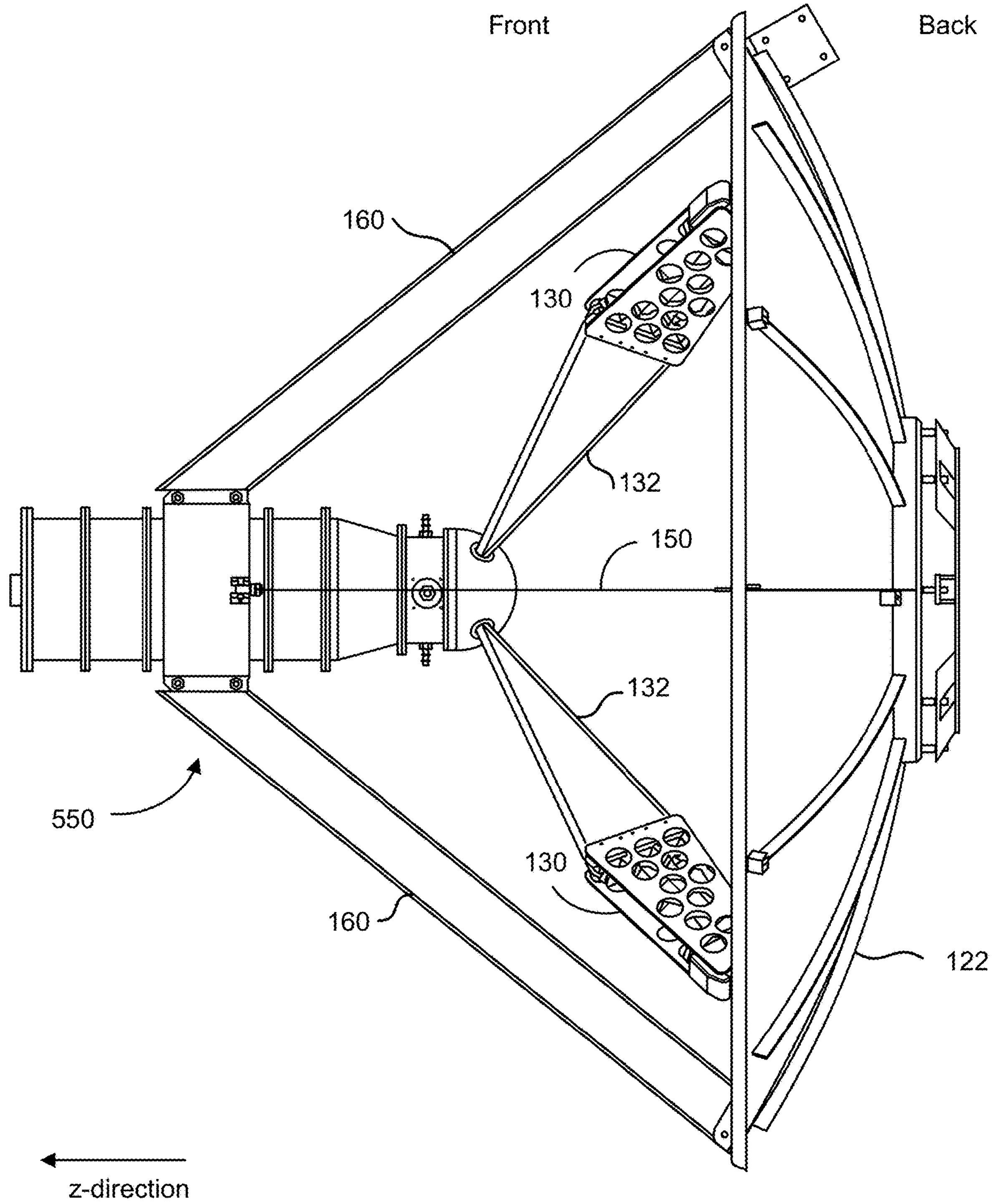
FIG. 1C is a top view of the pulser assembly and the antenna assembly illustrated in FIG. 1B.

FIG. 1C is a top view of the pulser assembly and the antenna assembly illustrated in FIG. 1B. Referring to FIG. 1C, pulser assembly 550 is mechanically connected to antenna reflector 122 using two conduits 160 and two guy wires, with guy wire 150 illustrated in this view. Thus, in the illustrated embodiment, a pair of conduits and a pair of guy wires are illustrated, but this particular configuration is not required. Two antenna arms, each including resistive section 130 and highly conductive section 132 are also shown. Conduits 160 provide mechanical support for pulser assembly 550 as well as conduits for oil lines and the high voltage input cable assembly to the pulser.

As illustrated in FIGS. 1B and 1C, the pulser assembly 550 is positioned in front of antenna reflector 122. In other words, the pulser assembly 550 is mechanically coupled to antenna reflector 122 by mounting collar 205, conduits 160, and guy wires 150. Mounting collar 205 is mechanically coupled to antenna reflector 122 by conduits 160, which are in compression, and guy wires 150, which are in tension. The antenna reflector 122 can be considered to have a front side and a back side. Radiated energy from antenna reflector 122 is directed in front of the antenna reflector along the z-direction. Thus, this mechanical structure enables pulser assembly 550 to be positioned along the direction of propagation of the radiated energy, i.e., in front of the antenna reflector or at a predetermined position along the z-axis. As discussed more fully in relation to FIGS. 5A and 5B, the bipolar VIG assembly can be positioned farthest from the antenna reflector, the oil lens can be positioned closest to the antenna reflector, and the peaking gap assembly can be positioned between the bipolar VIG assembly and the oil lens.

As described more fully herein, the minimum frequency that may be effectively radiated from a pair of antenna arm assemblies (with each individual antenna arm assembly including a highly conductive antenna arm section plus a resistive termination) within an impulse radiating antenna may be determined by the associated quarter wavelength of the highly conductive antenna arm section length. The length of the resistive termination provides the remainder of the required overall length of the antenna arm assembly that is necessary for the specific designed-to geometry of the UWB antenna. For example, a 1-meter-long antenna arm assembly with a highly conductive antenna arm section length of 0.5 m (and a resistive termination length of 0.5 m) provides a low frequency cutoff of 150 MHz, while a 1-meter-long antenna arm assembly with a highly conductive antenna arm section length of 0.25 m (and a resistive termination length of 0.75 m) provides a low frequency cutoff of 300 MHz, increased by a factor of two with respect to the 1-meter-long antenna arm assembly with equal length highly conductive and resistive sections.

Figure 1D:
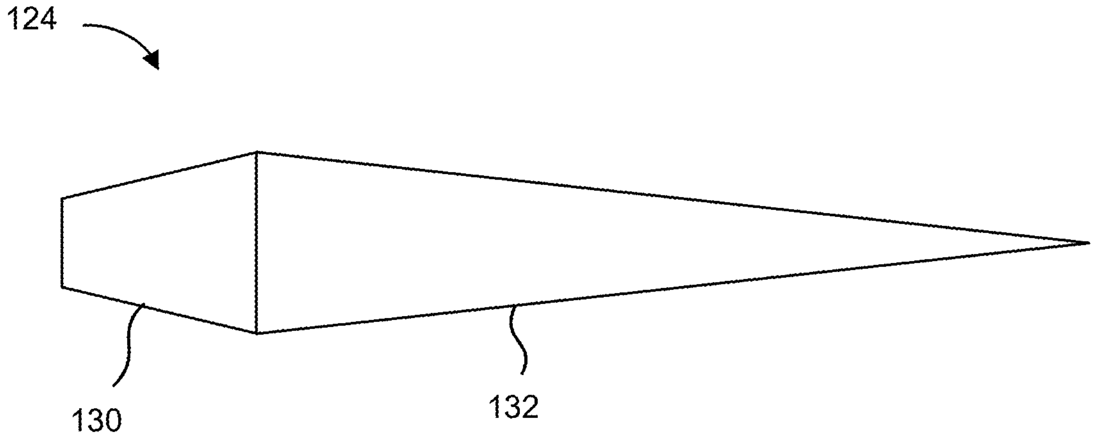
FIG. 1D is a simplified drawing of an antenna arm assembly characterized by a predetermined low frequency cutoff value according to an embodiment of the present invention.

FIG. 1D is a simplified drawing of an antenna arm assembly characterized by a predetermined (i.e., a designed-to) low frequency cutoff value according to an embodiment of the present invention. As illustrated in FIG. 1D, antenna arm 124 includes a resistive section 130 and a highly conductive section 132. In this embodiment, the length of highly conductive section 132 is equal to approximately three quarters of the total length of the antenna arm 124 and the length of resistive section 130 is equal to one quarter of the length of the antenna arm 124.

Figure 1E:
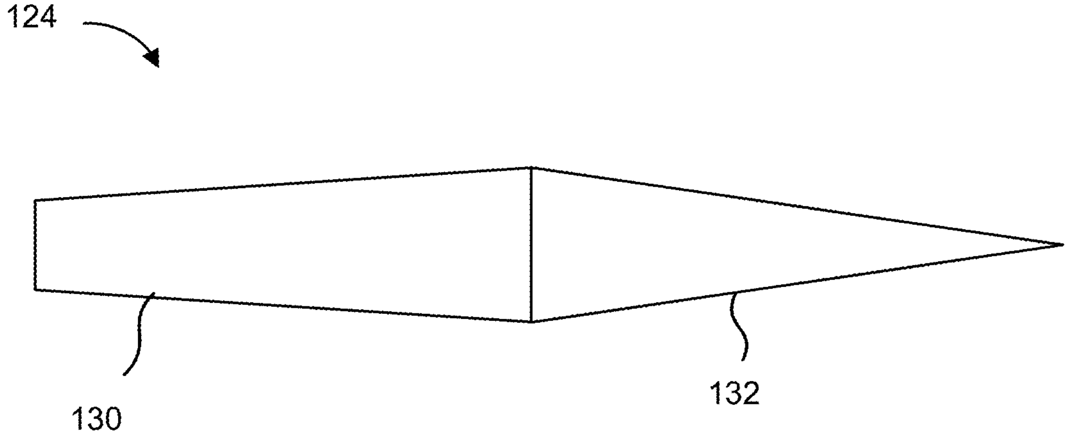
FIG. 1E is a simplified drawing of an antenna arm assembly characterized by an increased low frequency cutoff value according to an embodiment of the present invention.

FIG. 1E is a simplified drawing of an antenna arm characterized by an increased low frequency cutoff value according to an embodiment of the present invention. As illustrated in FIG. 1E, antenna arm 124 includes a resistive section 130 and a highly conductive section 132. In this embodiment, the length of highly conductive section 132 is equal to approximately one half of the total length of antenna arm 124 and the length of the resistive section 130 is also equal to one half of the length of the antenna arm 124. For equal overall antenna arm 124 lengths for FIGS. 1D and 1E, the value of the low frequency cutoff for FIG. 1E will be double that of the value of the low frequency cutoff for FIG. 1D.

Accordingly, by varying the lengths of highly conductive section 132 and resistive section 130, the low frequency cutoff value of the antenna assembly including the antenna arms can be varied. Thus, although the overall length of the antenna arm assemblies is unchanged, the low frequency cutoff value of antenna assembly can be varied as appropriate to the particular application.

Thus, embodiments of the present invention implement methods of changing the low frequency cutoff point for an impulse radiating antenna assembly. To raise the low frequency cutoff point, while keeping each overall antenna arm assembly (antenna arm plus resistive termination) the same length, the antenna arms are shortened and concurrently, the resistive termination sections of the antenna arm assemblies are lengthened. Thus, the low-end frequency response provided by embodiments of the present invention may be custom tailored to the end-user's requirements and the low frequency cutoff may be increased. Accordingly, embodiments of the present invention reduce the likelihood of friendly fire that would otherwise be associated with wider effective beam widths at lower frequencies.

The antenna utilized in the UWB system is non-resonant since the system transmits an impulse waveform rather than a continuous wave (CW) frequency or a set of fixed frequencies. Thus, the antenna may be referred to as a time domain antenna.

Figure 2A:
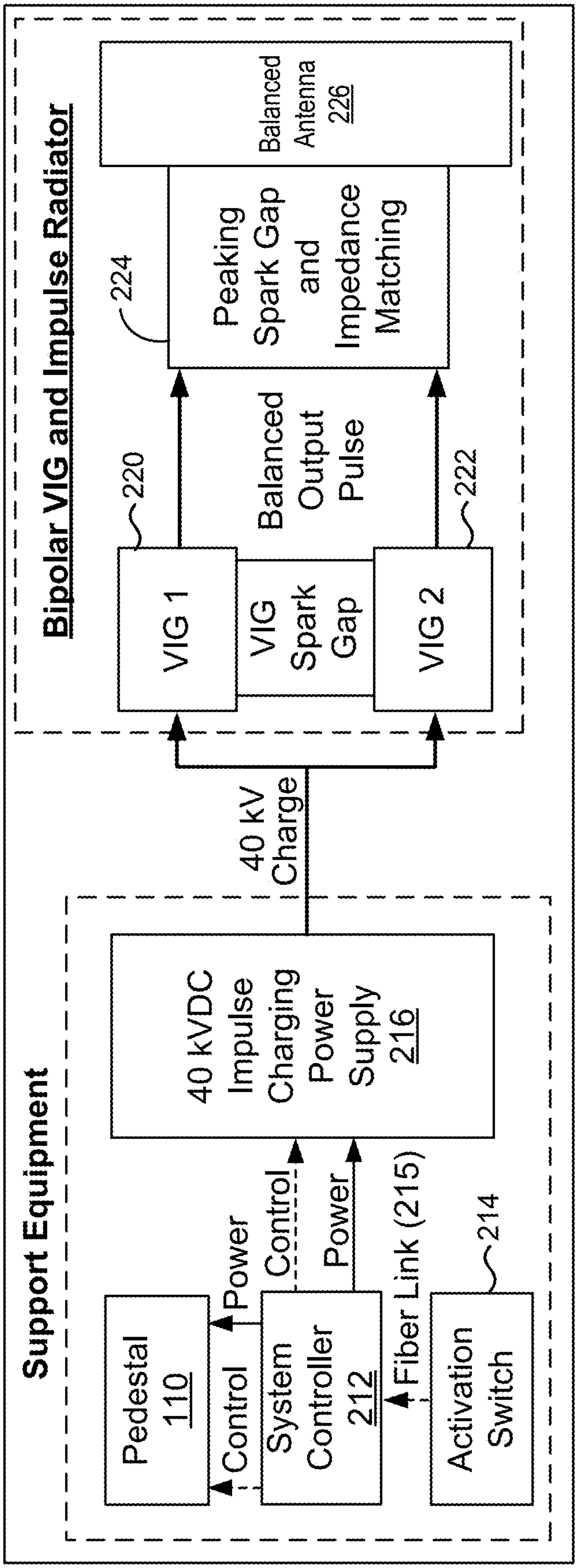
FIG. 2A is a simplified schematic block diagram illustrating components and subassemblies of an electromagnetic source according to an embodiment of the present invention.

FIG. 2A is a simplified schematic block diagram illustrating components of an electromagnetic source according to an embodiment of the present invention. Referring to FIG. 2A, elements shown in FIG. 1A are illustrated in schematic block diagram form. The electromagnetic source may be mounted to a pedestal positioner that is mounted on a mobile platform 110 to provide mechanical support and positioning of the system components. An exemplary mobile platform 110 is the M103A1 trailer chassis illustrated in FIG. 1A. A system controller 212 is utilized to control various components and is activated using an activation switch 214 that is located remotely from the electromagnetic source in order to prevent system operators from being located in close proximity to the source. As an example, the activation switch 214 can be located in a vehicle positioned on the order of 150 m from the electromagnetic source and in communication with the system controller 212 through a fiber optic communications and control link 215. The system controller 212 provides power and control signals to the 40 kVDC impulse charging power supply 216, which generates a 40 kV pulse as described more fully in relation to FIG. 8.

Although specific values for the various components of the electromagnetic source are discussed and illustrated herein, for example, 40 kV for the 40 kVDC impulse charging power supply 216, 500 kV for the individual VIGs 220 and 222, and 1 MV for the balanced pulse output produced by the bipolar VIG set, these values are not required by the present invention and other values can be utilized as appropriate to the particular application. Thus, embodiments that operate at higher or lower voltages, longer or shorter rise times, longer or shorter pulse widths, higher or lower energy per pulse, and the like are included within the scope of the present invention. One of ordinary skill in the art would recognize many variations, modifications, and alternatives.

Figure 5A:
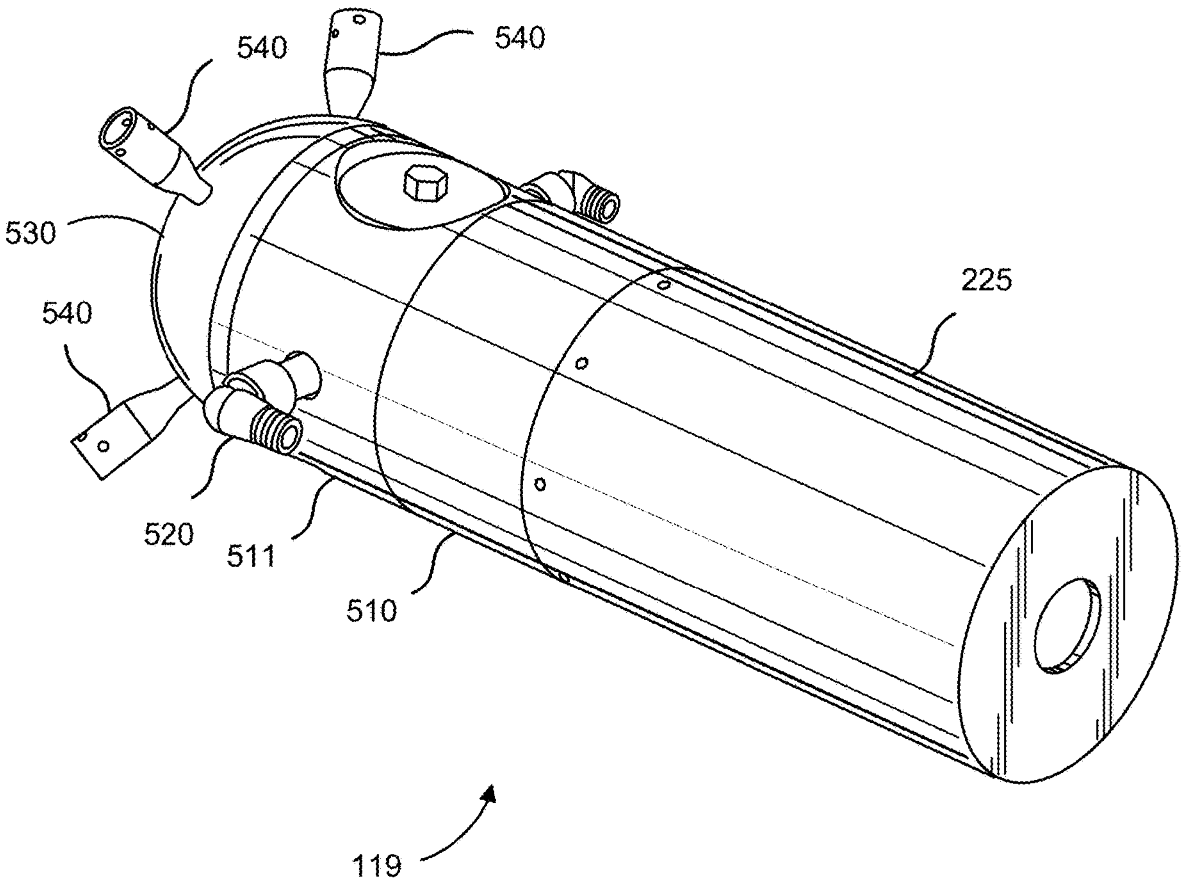
FIG. 5A is a perspective view of a pulser assembly according to an embodiment of the present invention.
Figure 5B:
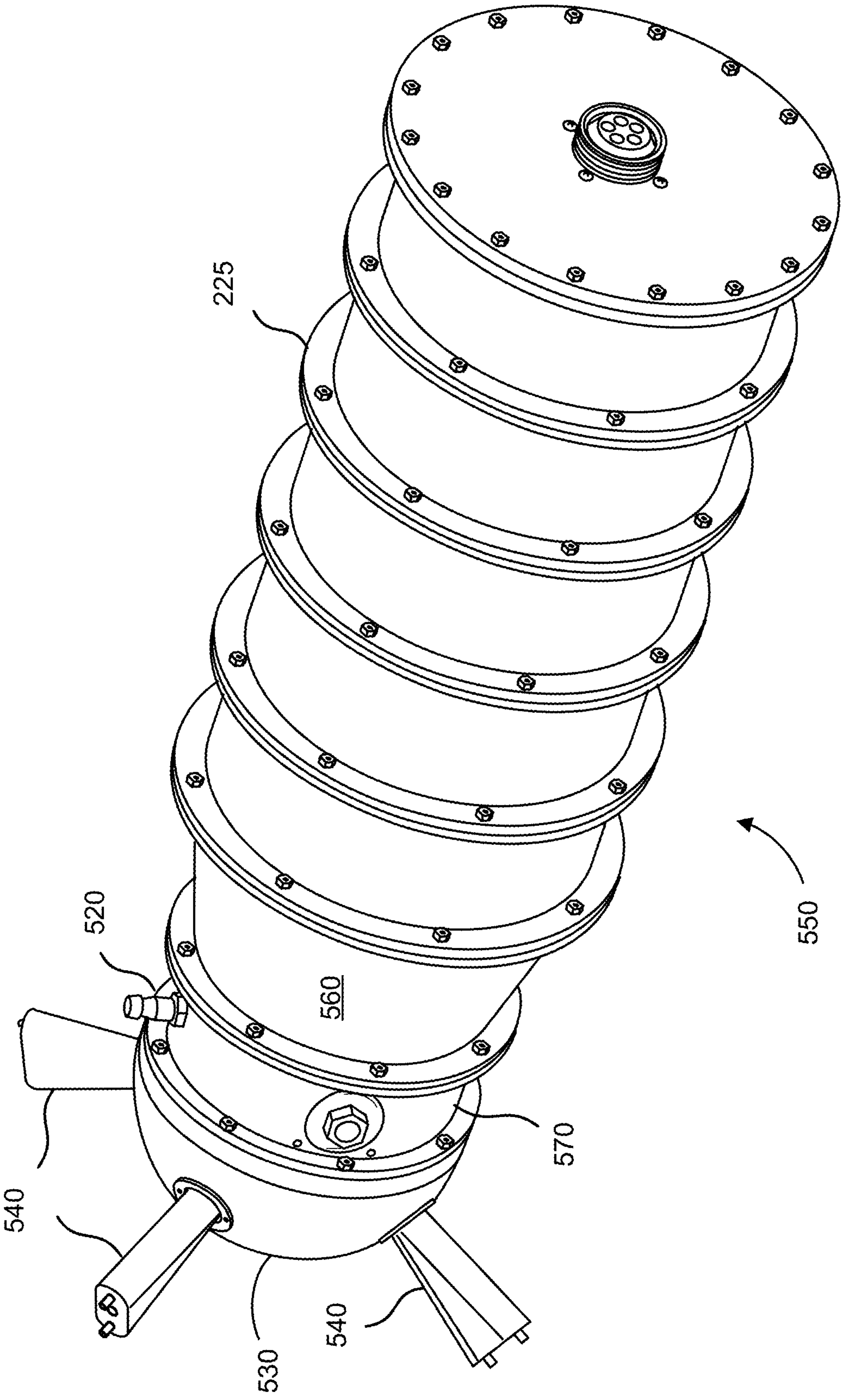
FIG. 5B is a perspective view of an alternative pulser assembly according to an embodiment of the present invention.

The output of the 40 kVDC impulse charging power supply 216 is provided as an input to a bipolar VIG pulse source described more fully in relation to FIGS. 5A and 5B. The bipolar VIG pulse source includes two VIGs 220 and 222 (e.g., 500 kV VIGs) operated in a differential configuration and producing a balanced output pulse of up to 1 MV. An impedance matching section and a peaking gap assembly 224 are utilized to reduce the rise time of the balanced output pulse, which is radiated as an impulse using a balanced, ultra-wideband, balanced antenna 226.

Figure 2B:
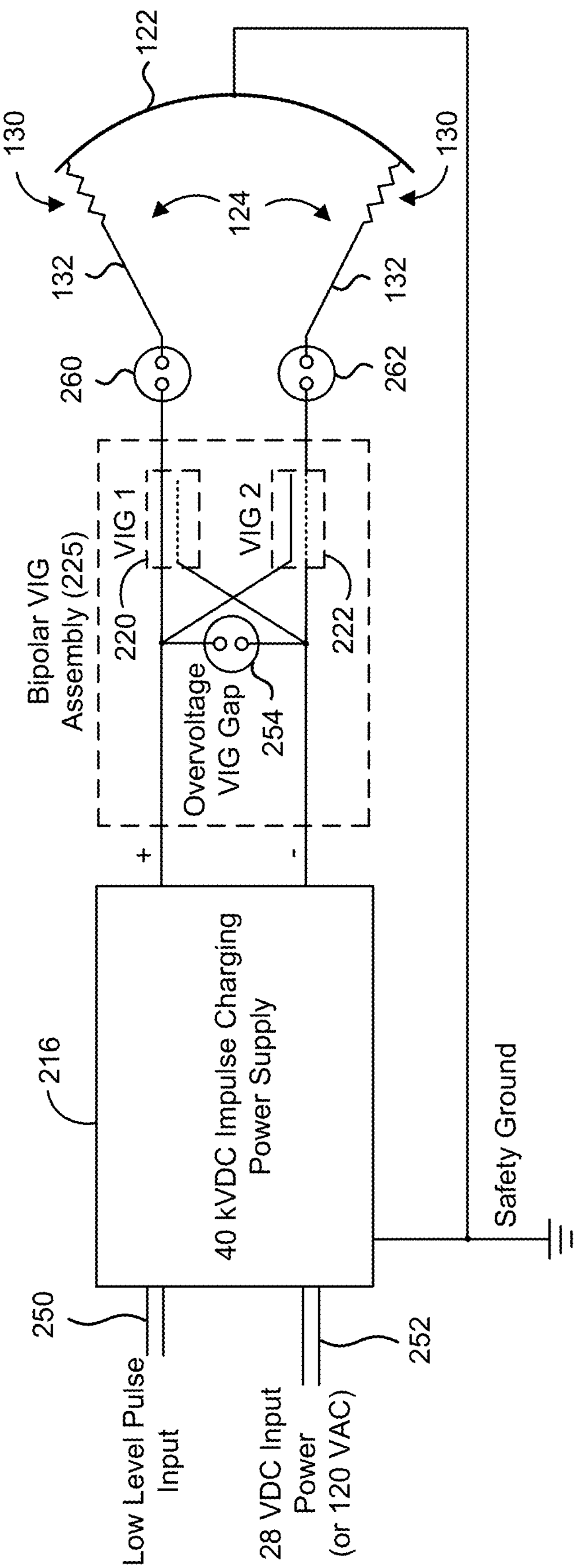
FIG. 2B is a simplified schematic diagram illustrating additional components of the electromagnetic source according to an embodiment of the present invention.

FIG. 2B is a simplified schematic diagram illustrating additional components of the electromagnetic source according to an embodiment of the present invention. As illustrated in FIG. 2B, a 40 kVDC impulse charging power supply 216 is connected to the bipolar VIG assembly 225. In the embodiment illustrated in FIG. 2B, the 40 kVDC impulse charging power supply 216 receives a first input from low level pulse input 250 and a second input from 28 VDC input power 252, which can also be a 120 VAC source in other implementations. Additional description related to implementations of the 40 kVDC impulse charging power supply 216 is provided in relation to FIGS. 8 and 9. Bipolar VIG assembly 225 includes an overvoltage VIG gap 254. VIG1 220 of the bipolar VIG assembly 225 is connected to first overvoltage oil peaking gap 260, which is connected via two antenna arms 124 that include highly conductive sections 132 and resistive sections 130 (only a single antenna arm 124 is illustrated). VIG2 222 of the bipolar VIG assembly 225 is connected to second overvoltage oil peaking gap 262, which is connected via two antenna arms 124 that include highly conductive sections 132 and resistive sections 130 (only a single antenna arm 124 is illustrated).

In an embodiment, the resistive sections 130, which can also be referred to as antenna arm terminations, can have a resistance of 200Ω although this specific value is not required. The resistive sections 130, i.e., the antenna arm terminations, terminate at the antenna reflector 122. As discussed above, although only two antenna arms 124 are illustrated in this figure, it will be appreciated that four antenna arms and, thus, four resistive antenna arm terminations are utilized in some embodiments.

Figure 2C:
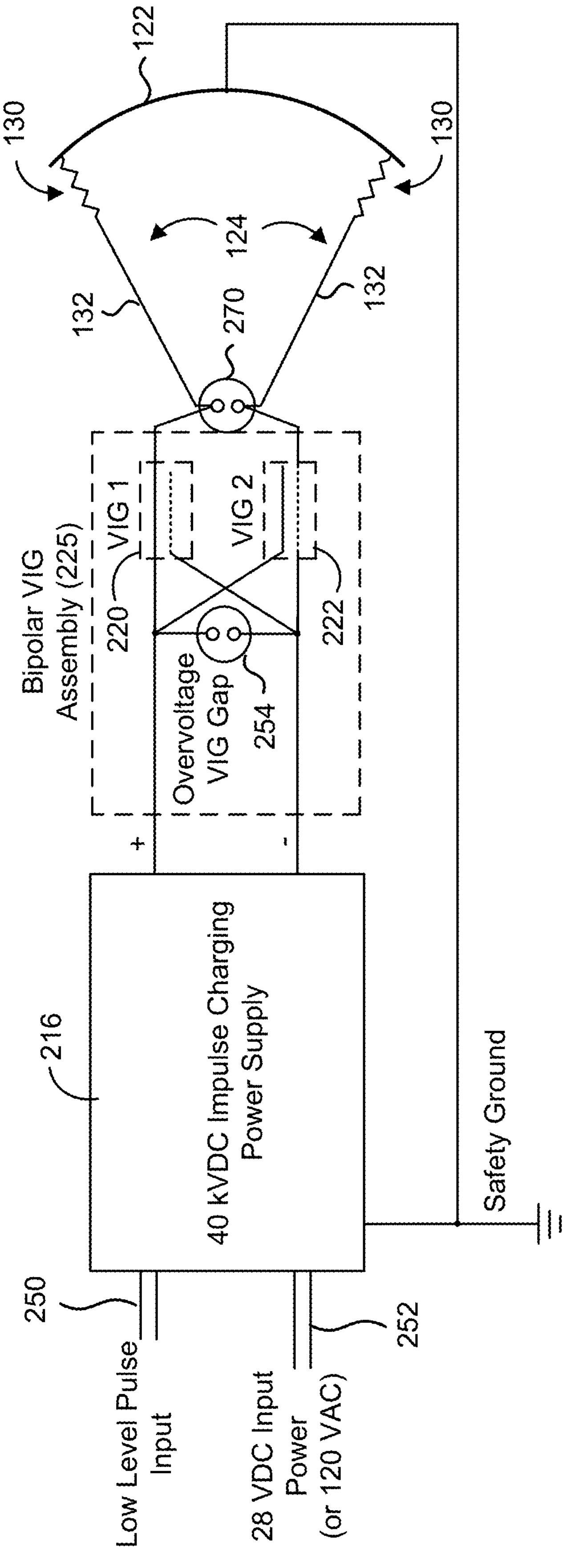
FIG. 2C is an alternate, simplified schematic diagram illustrating additional components of the electromagnetic source according to an embodiment of the present invention.

FIG. 2C is a simplified schematic diagram that illustrates an alternate peaking gap configuration to that which is depicted in FIG. 2B. Some of the components of the electromagnetic source illustrated in FIG. 2C are shared with the electromagnetic source illustrated in FIG. 2B and the description provided in relation to FIG. 2B is applicable as appropriate. In contrast with FIG. 2B, the embodiment illustrated in FIG. 2C utilizes a single overvoltage oil peaking gap 270 in place of first overvoltage oil peaking gap 260 and second overvoltage oil peaking gap 262.

Figure 3A:
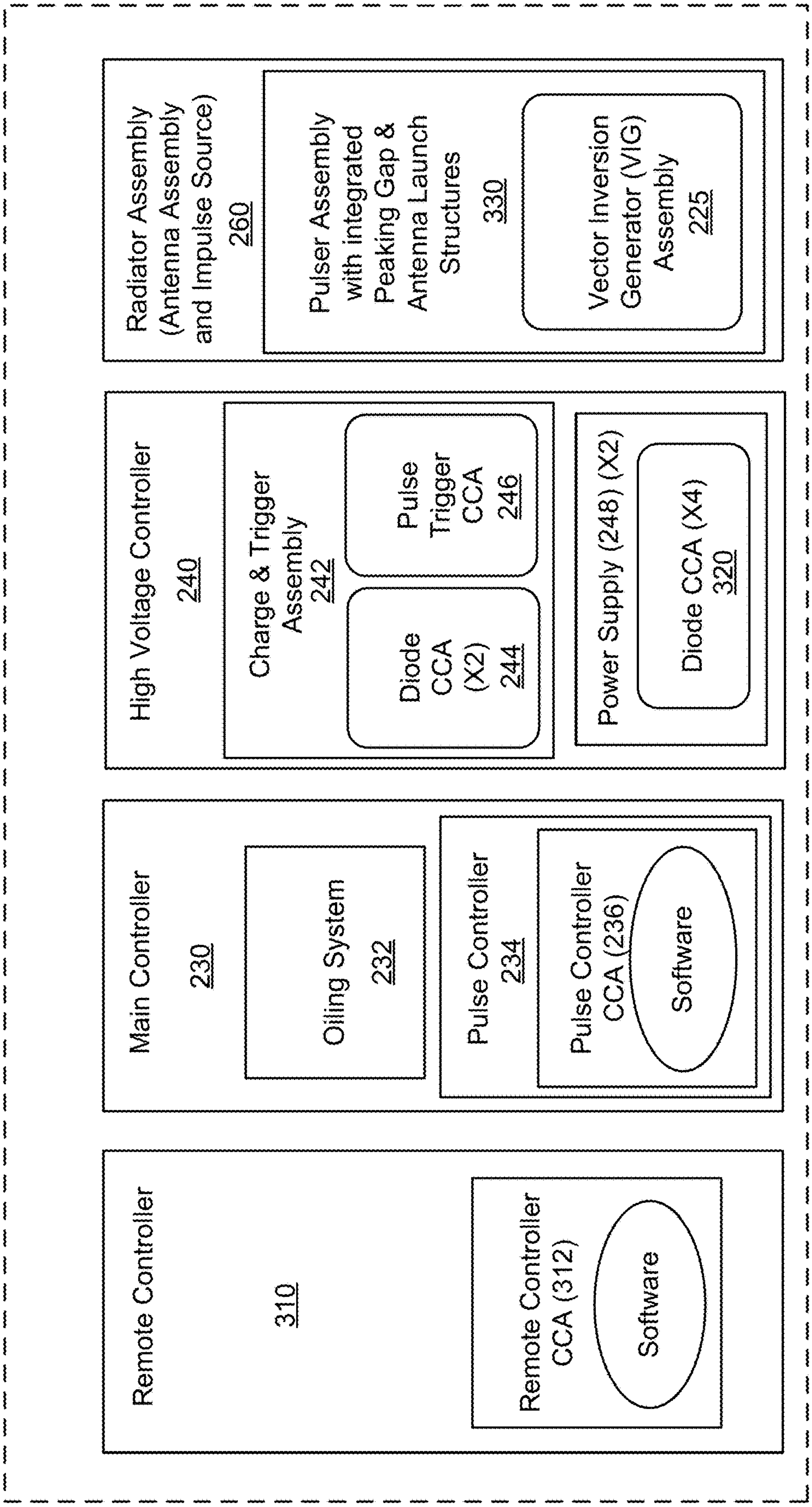
FIG. 3A is another simplified block diagram illustrating components and subassemblies of an electromagnetic source according to an embodiment of the present invention.
Figure 3B:
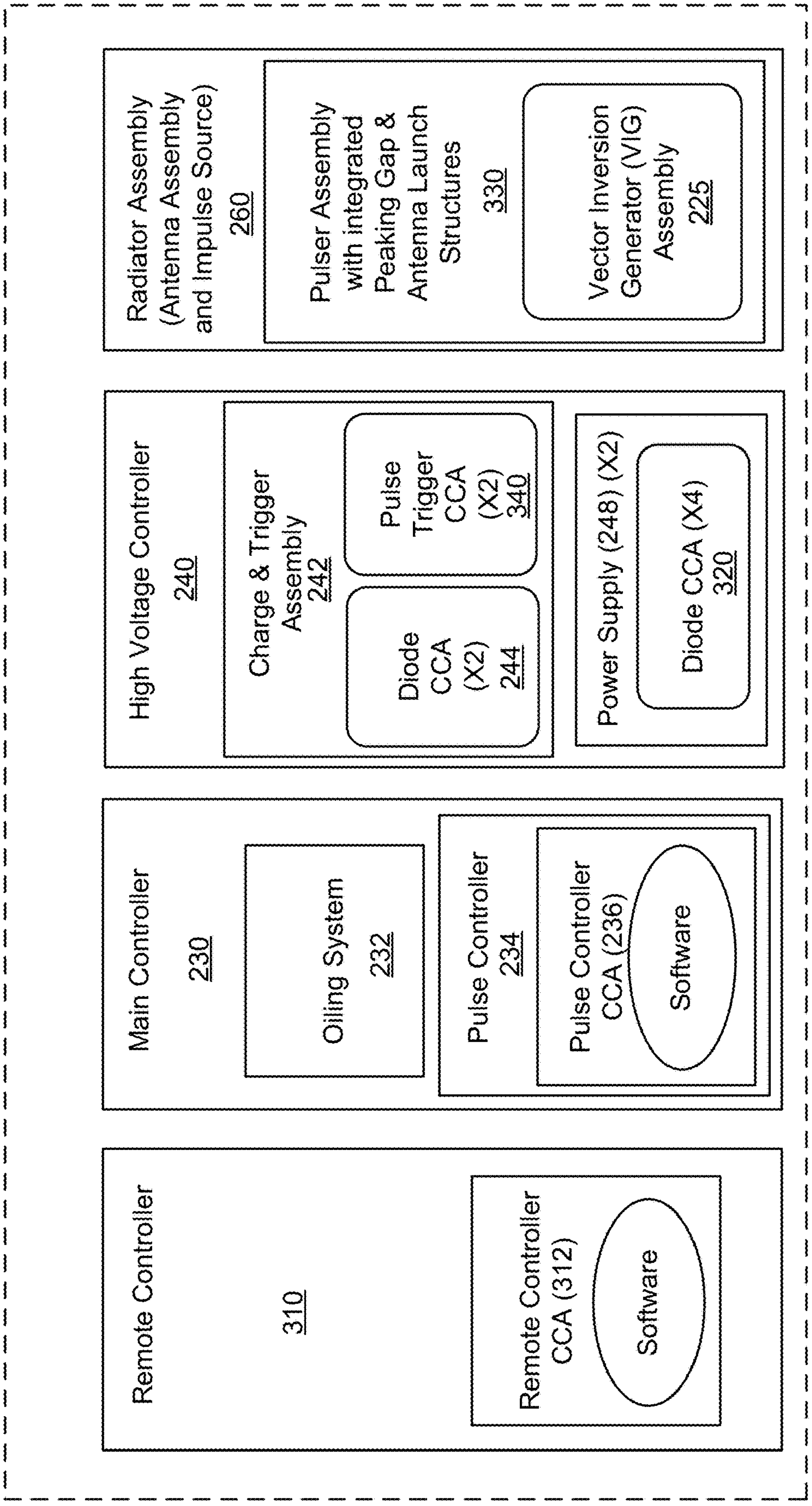
FIG. 3B is yet another simplified block diagram illustrating components and subassemblies of an electromagnetic source according to an embodiment of the present invention.

FIGS. 3A and 3B are additional simplified block diagrams illustrating components and subassemblies of an electromagnetic source according to an embodiment of the present invention. Similar components are illustrated in FIGS. 2A, 2B, 2C, 3A, and 3B and the discussion provided in relation to these components in FIGS. 2A, 2B, and 2C is applicable to FIGS. 3A and 3B as appropriate.

Referring to FIG. 3A, the electromagnetic source includes a remote controller 310 that includes a remote controller circuit card assembly (CCA) 312 that is operating using appropriate software. The main controller 230 provides control for the oiling system 232 (coupled to the oil lens 530 discussed in relation to FIGS. 5A and 5B) and the pulse controller 234, which includes pulse controller CCA 236 and is used to initiate the high voltage controller 240. In the embodiment illustrated in FIG. 3A, the high voltage controller 240 includes a charge and trigger assembly 242, which contains diode CCAs 244 and a pulse trigger CCA 246.

One method of producing a differential high voltage charging pulse is to use a set of power supplies (one positive with respect to the return, and one negative with respect to the return). Thus, two power supplies 248 are included in the high voltage controller 240, with each of the power supplies 248 including a set of diode CCAs 320.

The pulser assembly is integrated with the antenna reflector via the antenna launch structures and antenna arms to provide a pulser assembly with integrated peaking gap and antenna launch structures 330. The pulser assembly, as described in relation to FIGS. 5A and 5B, includes the bipolar VIG assembly 225, the impedance matching structure, and the peaking gap assembly. In an embodiment, the antenna assembly is based on an IRA antenna with a parabolic reflector and utilizes a pair of 400Ω transverse electromagnetic (TEM) antennas (net impedance of 200Ω) directed at the antenna reflector. An IRA antenna produces a plane wave with an approximate far field delta function and does not have the high frequency roll off that is normally inherent with non-lens TEM antennas.

In the embodiment illustrated in FIG. 3B, the high voltage controller 240 includes a set of charge and trigger assembly 242, which include diode CCAs 244 and two pulse trigger CCAs 340.

Figure 4:
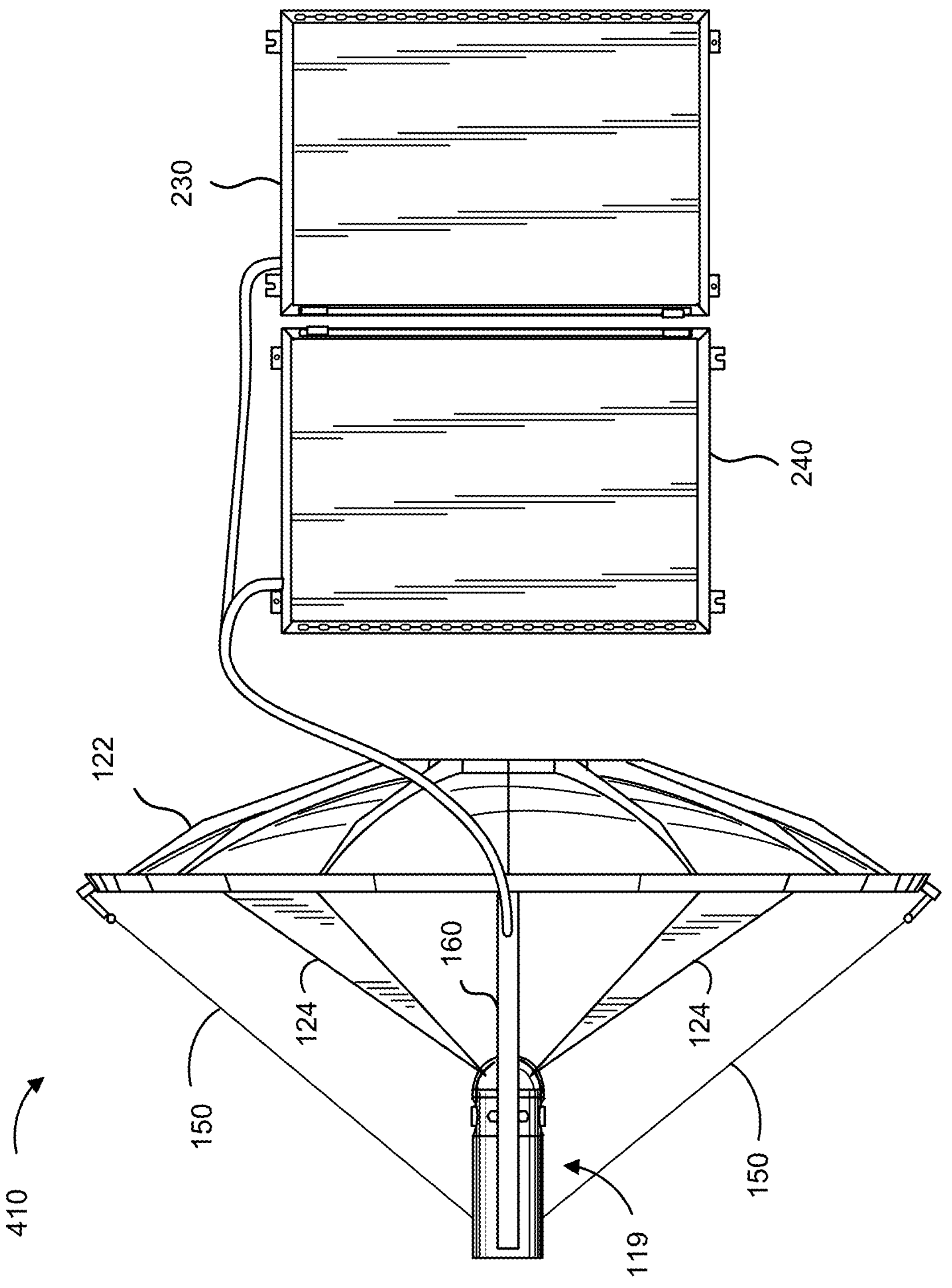
FIG. 4 is a side view diagram illustrating components of an electromagnetic source according to an embodiment of the present invention.

FIG. 4 is a side view diagram illustrating components of an electromagnetic source according to an embodiment of the present invention. In some embodiments, the antenna assembly 410 is implemented as an impulse radiating antenna (IRA) that may be configured as a dominantly polarized antenna. In other embodiments, the IRA can be configured and driven as a dual-polarized antenna, although this is not required. The electromagnetic radiation emitted by the electromagnetic source, i.e., from the antenna assembly 410, couples to individual back door/front door coupling mechanisms within the target (e.g., wiring, circuit boards, circuit board traces, electrical subassemblies, antennas, etc. within the sUAS).

The antenna reflector 122 is integrated within the antenna system via TEM radiating antenna arms 124 that focus the energy in the direction of the antenna reflector 122 prior to reflection toward the region in front of the antenna reflector, for example, toward a sUAS target. Additional description related to the pulser assembly 119 is provided in relation to FIGS. 5 and 6. Integrating the pulser assembly 119 within the antenna assembly 410 enables the system to not require a transmission line between a source located outside of the antenna assembly and the antenna feed location, for example, a vacuum waveguide, to route the high voltage output of the pulser assembly 119 to the antenna feed point. The antenna feed point resides within the oil lens within the pulser assembly 119. By eliminating the need to pump down a vacuum waveguide, system set up and power-on times are reduced, resulting in a rapidly deployed system.

In some implementations, the pulser assembly 119 receives the output of a 40 kVDC impulse charging power supply 216 included in high voltage controller 240 as the input to the pulser assembly. As illustrated in FIG. 4, the 40 kVDC impulse charging power supply 216 is represented as an element of the high voltage controller 240. A main controller 230 can be utilized to control the high voltage controller 240. During use, components of the high voltage controller 240 will be prompted by the main controller 230 to generate an impulse charge in the high voltage controller 240 that is provided to the pulser assembly 119, for example, a 1 μs impulse charge. Because the pulser assembly 119 is positioned in front of the antenna reflector 122 and electrically coupled to the antenna feed section of the antenna arms, significant improvements in system efficiency are provided in comparison with conventional techniques. As an example, waveform integrity is preserved because of the short distance between the pulser assembly 119 and the antenna feed section of the antenna arms 124. The antenna reflector 122 focuses the electromagnetic energy from the antenna arms and provides high gain.

FIG. 5A is a perspective view of a pulser assembly according to an embodiment of the present invention. The pulser assembly 119 illustrated in FIG. 5A is implemented as a peaked, spiral line Vector Inversion Generator (VIG) source that is capable of producing a megavolt-level output pulse. The pulser assembly 119 includes a bipolar VIG assembly 225, an impedance matching section 510, a peaking gap assembly 511, an oil fitting 520, an oil lens 530, and a plurality of antenna arm interfaces 540.

Advantages of using a VIG-based pulser assembly 119 include the fact that a VIG-based source is more efficient than a solid-state amplifier or vacuum tube source, making battery-powered operation possible. Moreover, higher peak output power is achieved than may be provided with vacuum tube, solid-state RF amplifier, or solid-state ultrafast recovery diode sources. The pulser assembly 119 is compact and volumetrically efficient compared to alternative pulsed power sources, has a lifetime of up to 1 million pulses, and does not require any maintenance of the pulser assembly. In some embodiments, the pulser assembly 119 provides a lifetime of greater than 1 million pulses, although this is not required.

Advantages of using a bipolar VIG (i.e., two single-ended VIGs driven simultaneously) as illustrated in FIG. 2A instead of one single-ended VIG include: a) Utilizing two VIGs provides the advantageous differential output to the true differential load (the antenna). b) The voltage output of each of the two individual VIGs may be added to each other. This reduces voltage stress on each of the individual VIGs, as each individual VIG will only have to generate half of the total required pulser output voltage. In other words, if only one VIG were used, it would have to develop twice the voltage. c) A faster rise time is achieved with two individual VIGs. Each of the individual VIGs will have a faster rise time than may be achieved with just one VIG at double the output voltage. This is due to the transit time for the number of spiral turns within each VIG. A single VIG at double the voltage requires more turns, and thus requires more transit time. The two individual VIGs are driven simultaneously, with a single stimulus event. Each of the individual VIGs will have a faster transit time, is initiated at the same time, and erects in opposite polarity simultaneously. Thus, the systems described herein are implemented as a differential (balanced) antenna that is driven with a differential (balanced) source that is coupled to the antenna arms.

Embodiments of the present invention provide enhanced system performance with respect to conventional techniques as the UWB source may be collocated with the antenna arms and the antenna reflector due to the small size associated with the pulser assembly. Moreover, the small size of the pulser assembly results in a reduction in the aperture blockage in comparison with conventional techniques.

The antenna arms pass to the interior of the pulser assembly, joining the pulser assembly 119 at the oil lens 530. As a result, the antenna arms and the pulser assembly are implemented as a single structure, contributing to output pulse signal integrity and small system size.

The antenna arms are resistively terminated at the antenna reflector using high voltage resistor assemblies. As a result, frequencies that are not radiated by the system (e.g., low frequencies that are not transmitted by the antenna arms) will be absorbed in the resistive terminations.

FIG. 5B is a perspective view of an alternative pulser assembly according to an embodiment of the present invention. The pulser assembly 550 illustrated in FIG. 5B shares common features with the pulser assembly 119 illustrated in FIG. 5A and the description provided in relation to FIG. 5A is applicable to FIG. 5B as appropriate.

Referring to FIG. 5B, bipolar VIG assembly 225 is connected to peaking gap assembly 570 by impedance matching structure 560. The impedance matching structure 560 has a tapered outer diameter, increasing in thickness from the side of peaking gap assembly adjacent oil lens 530 to the side of impedance matching structure 560 adjacent bipolar VIG assembly 225. Oil fitting 520 and a plurality of antenna arm interfaces 540 are also illustrated.

Figure 6A:
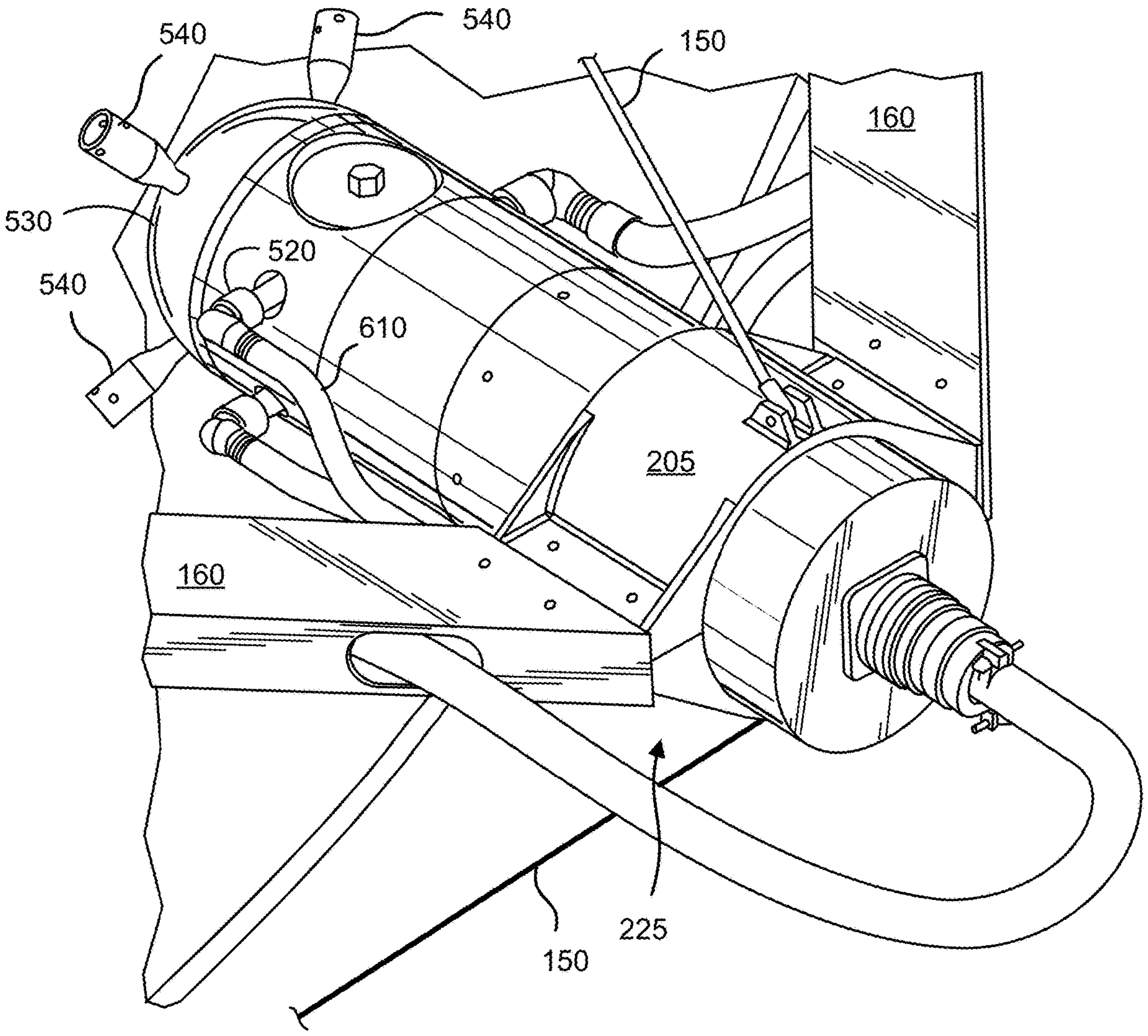
FIG. 6A is another perspective view of a pulser assembly including cabling according to an embodiment of the present invention.

FIG. 6A is another perspective view of a pulser assembly including cabling according to an embodiment of the present invention. In this perspective view, the mechanical support for the pulser assembly 119 is illustrated, with cabling for control and power connected to the bipolar VIG assembly 225. Other components, such as oil lines 610 connected to the oil fitting 520 for the oil lens 530, are also illustrated.

Figure 6B:
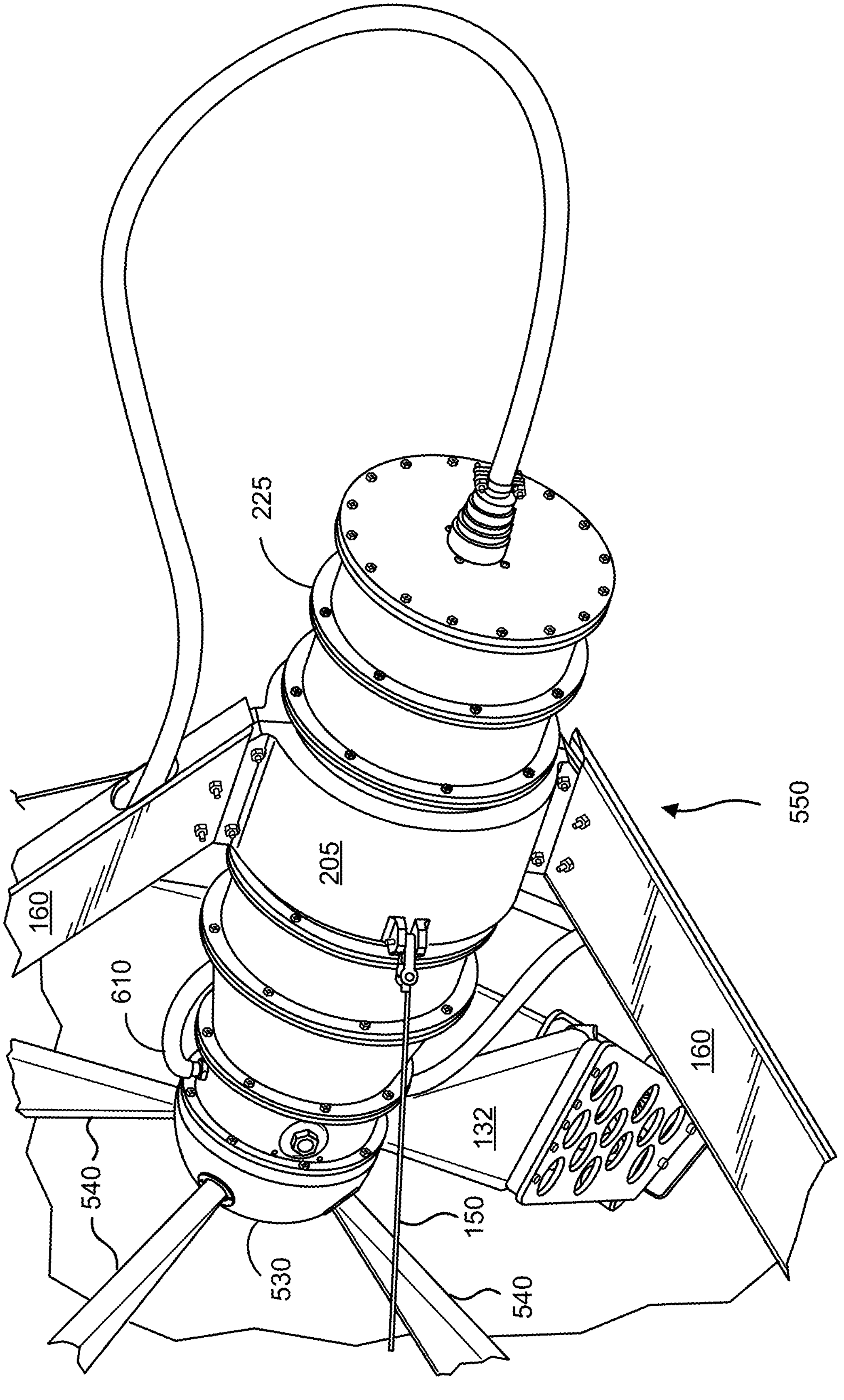
FIG. 6B is a perspective view of an alternative pulser assembly including cabling according to an embodiment of the present invention.

FIG. 6B is a perspective view of an alternative pulser assembly including cabling according to an embodiment of the present invention. The alternative pulser assembly 550 illustrated in FIG. 6B shares common features with the pulser assembly 119 illustrated in FIG. 6A and the description provided in relation to FIG. 6A is applicable to FIG. 6B as appropriate.

In this perspective view, the mechanical support for the pulser assembly 550 is illustrated, with cabling for control and power connected to the bipolar VIG assembly 225. Other components, such as oil lines 610 connected to the oil fitting for the oil lens 530, are also illustrated.

Figure 7:
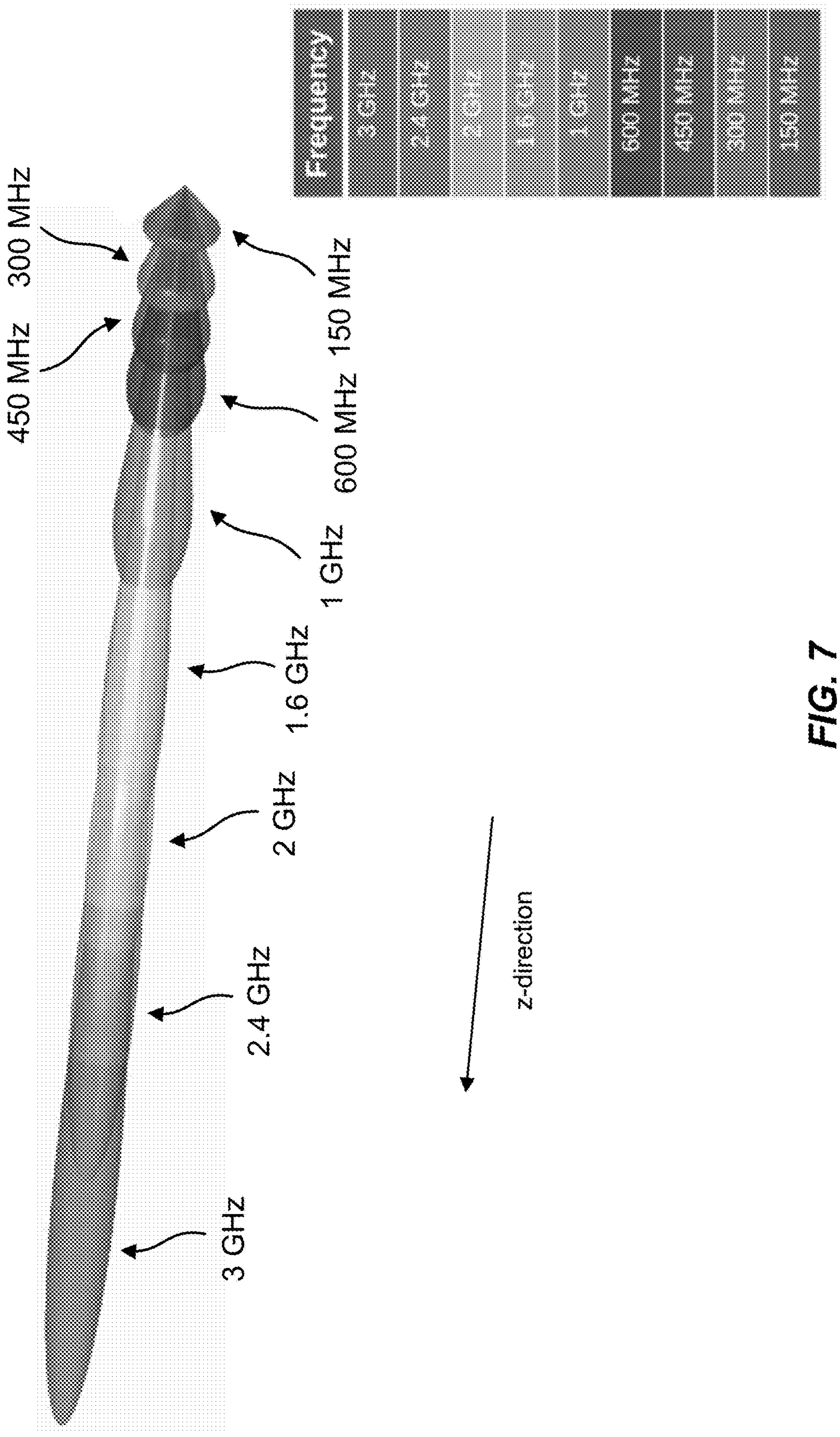
FIG. 7 is a drawing illustrating a beamform energy pattern at various frequencies according to an embodiment of the present invention.

FIG. 7 is a drawing illustrating a beamform energy pattern at selected illustrative various frequencies according to an embodiment of the present invention. As illustrated in FIG. 7, the beam produced by embodiments of the present invention is characterized by relatively short-range lobes associated with lower frequencies (e.g., hundreds of MHz) and relatively long range lobes associated with higher frequencies (e.g., several GHz). At intermediate frequencies, lobes of varying range are produced. It will be appreciated that the energy distribution of the radiated energy is continuous in frequency space and extends over a range of frequencies, for example, from 150 MHz to 3 GHz, and the lobes corresponding to selected frequencies shown in FIG. 7 are merely exemplary and utilized in order to illustrate the beamwidth and longitudinal dimensions corresponding to various frequency components distributed throughout the continuous frequency range of the radiated energy.

As illustrated in FIG. 7, the frequency range of the radiated energy is inversely related to the beamwidth. For example, for a selected antenna reflector aperture size, at a frequency of 150 MHz, the beamwidth is on the order of 70°. In contrast, at a frequency of 3 GHz with the same aperture size, the beamwidth is on the order of 4°. Accordingly, at low frequencies (which exhibit greater beamwidths), the potential for electronic fratricide is much greater than at higher frequencies. As a result, embodiments of the present invention utilize designs for the antenna arm assemblies that constrain the low-frequency cutoff of the radiated energy in order to reduce or minimize the potential for electronic fratricide, while maintaining the same antenna reflector aperture size and antenna gain. As an example, in an implementation in which a radiated output of 150 MHz to 3 GHz is reduced to a radiated output of 1 GHz to 3 GHz (with a new beamwidth ranging from ~11° to 4°), the maximum system beamwidth will be reduced from ~70° to 11°, thus reducing the potential for electronic fratricide.

It should be noted that, although FIG. 7 depicts lobes at select frequencies, it will be appreciated that the figure is merely illustrative and that the energy distribution will be continuous. Depending on the beam intensity, an sUAS may be defeated at a given range at which the radiated energy disrupts or defeats operation of sUAS components, and may be destroyed at closer ranges (including damage of sUAS components).

In contrast with narrow-band high-power microwave systems that only radiate within limited frequency ranges and are thus not effective across all possible susceptible sUAS/UAS communications frequencies and electronic assembly/wiring coupling frequencies simultaneously, embodiments of the present invention provide UWB HPEM operation. As illustrated in FIG. 7, embodiments of the present invention transmit across an ultra-wideband frequency range, for example, from hundreds of MHz to several GHz, enabling the radiated energy to engage sUAS/UAS via front door coupling (e.g., communication and/or navigation antennas) and back door coupling (e.g., coupling to cables, wiring, circuit boards, motors, optical sensors, etc.) simultaneously. This permits the simultaneous engagement of multiple different sUAS/UAS types, with varying vulnerability characteristics, without prior knowledge of the specific vulnerabilities of any or all of them.

As an example, as an sUAS interacts with the radiated beam and couples with 2.4 GHz radiation, a communications system operating at 2.4 GHz would be compromised. As an sUAS interacts with the radiated beam and couples with 1.6 GHz radiation, a navigation system operating at 1.6 GHz would be compromised. At points along the radiated beam, depending on the lengths of cables, wiring, circuit boards, motors, optical sensors, etc. within the sUAS, these cables, wiring, circuit boards, motors, optical sensors, etc. will act as antennas, coupling energy into the sUAS and resulting in induced voltage levels that will disrupt, damage, or destroy the components of the sUAS. Thus, embodiments of the present invention are agnostic to the specific vulnerabilities of the sUAS since the energy distribution of the radiated energy is continuous in frequency space and extends over a wide range of frequencies and, as the sUAS transects the beam of radiated energy, the components of the sUAS will couple to the radiated energy at the appropriate frequency. Moreover, embodiments of the present invention are useful in disrupting, damaging, or destroying heterogeneous fleets of sUASes without the need to tune the radiated energy to match the vulnerabilities of different sUASes.

It should be noted that, in addition to use as a C-sUAS DEW system, embodiments of the present invention may also be used as 1) a phase coherent UWB radar source and 2) for electronics vulnerability testing (of computer, communications, and other electronics systems).

Figure 8:
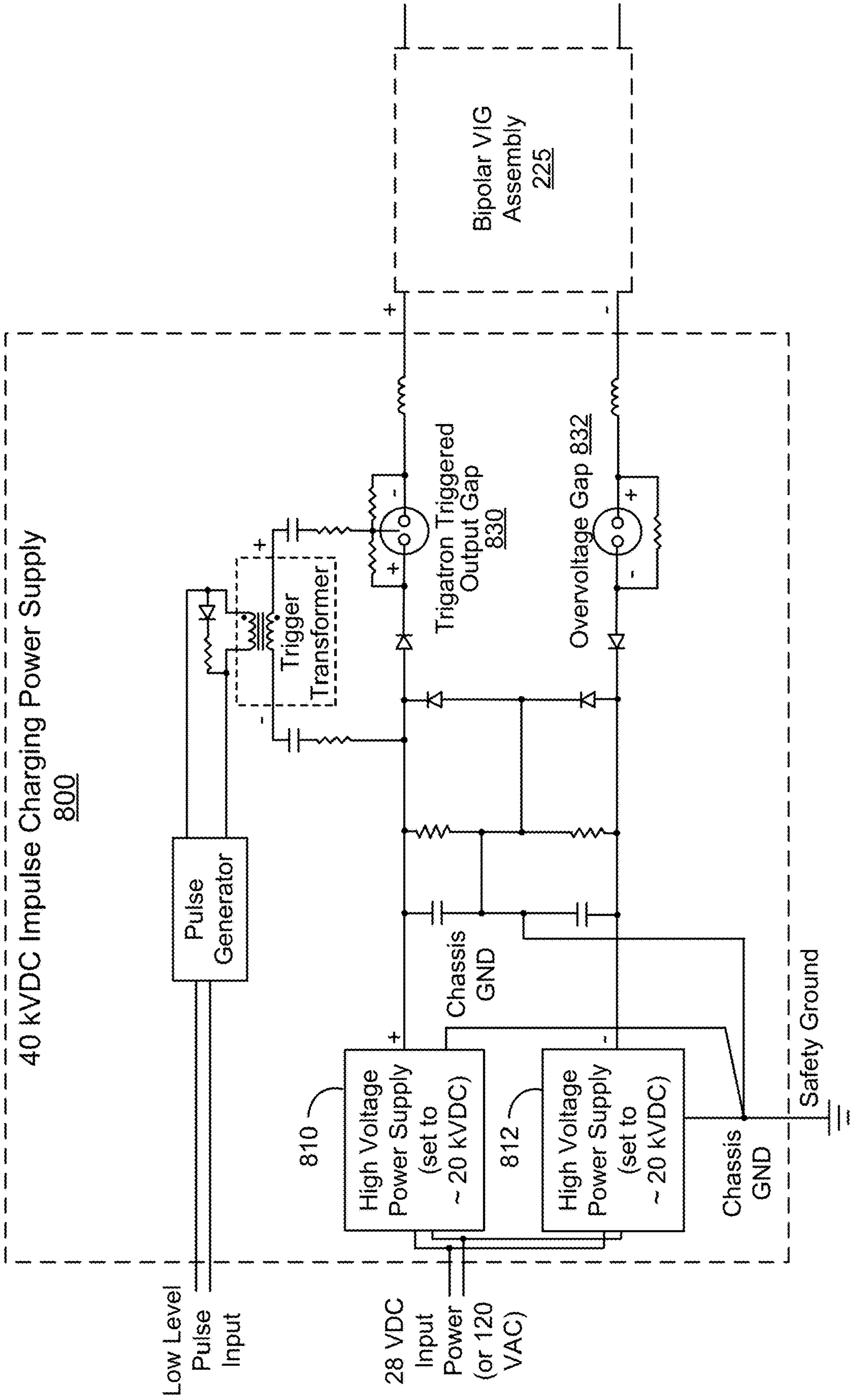
FIG. 8 is a simplified circuit schematic illustrating a 40 kVDC impulse charging power supply according to an embodiment of the present invention.

FIG. 8 is a simplified circuit schematic illustrating a 40 kVDC impulse charging power supply according to an embodiment of the present invention. Referring to FIG. 1A, the high voltage controller 118 contains the 40 kVDC impulse charging power supply 800 illustrated in FIG. 8. In FIG. 8, the 40 kVDC impulse charging power supply 800 is implemented as a resonant charging supply that utilizes a single triggered output gap 830 on the positive leg and an overvoltage gap 832 on the return leg (i.e., the negative leg). The use of an overvoltage gap 832 on the return leg simplifies triggering since there is no need to provide alignment of two triggered output gaps. This high voltage, i.e., 40 kVDC impulse charging power supply 800 utilizes two high voltage (HV) power supplies, i.e., first HV power supply 810 and second HV power supply 812, and switch devices/circuits to provide a bipolar (differential) high voltage impulse charging source for the bipolar VIG assembly 225, which can be considered as a capacitive load that can be charged using currents on the order of one to several kiloamps within a short timeframe, for example, times on the order of 1 μs.

The utilization of a high voltage impulse charging power supply such as that illustrated in FIG. 8 to pulse charge the bipolar VIG assembly 225 provides less voltage stress on the bipolar VIG assembly (i.e., the VIG pulser assembly) in-between pulses and provides a means of producing commanded system output pulses/output pulse bursts/output pulse sequences via a microprocessor (not shown). This provides a means of optimizing and fine-tuning the pulsed system output for increased effectiveness towards specific targets or groups of targets.

Figure 9:
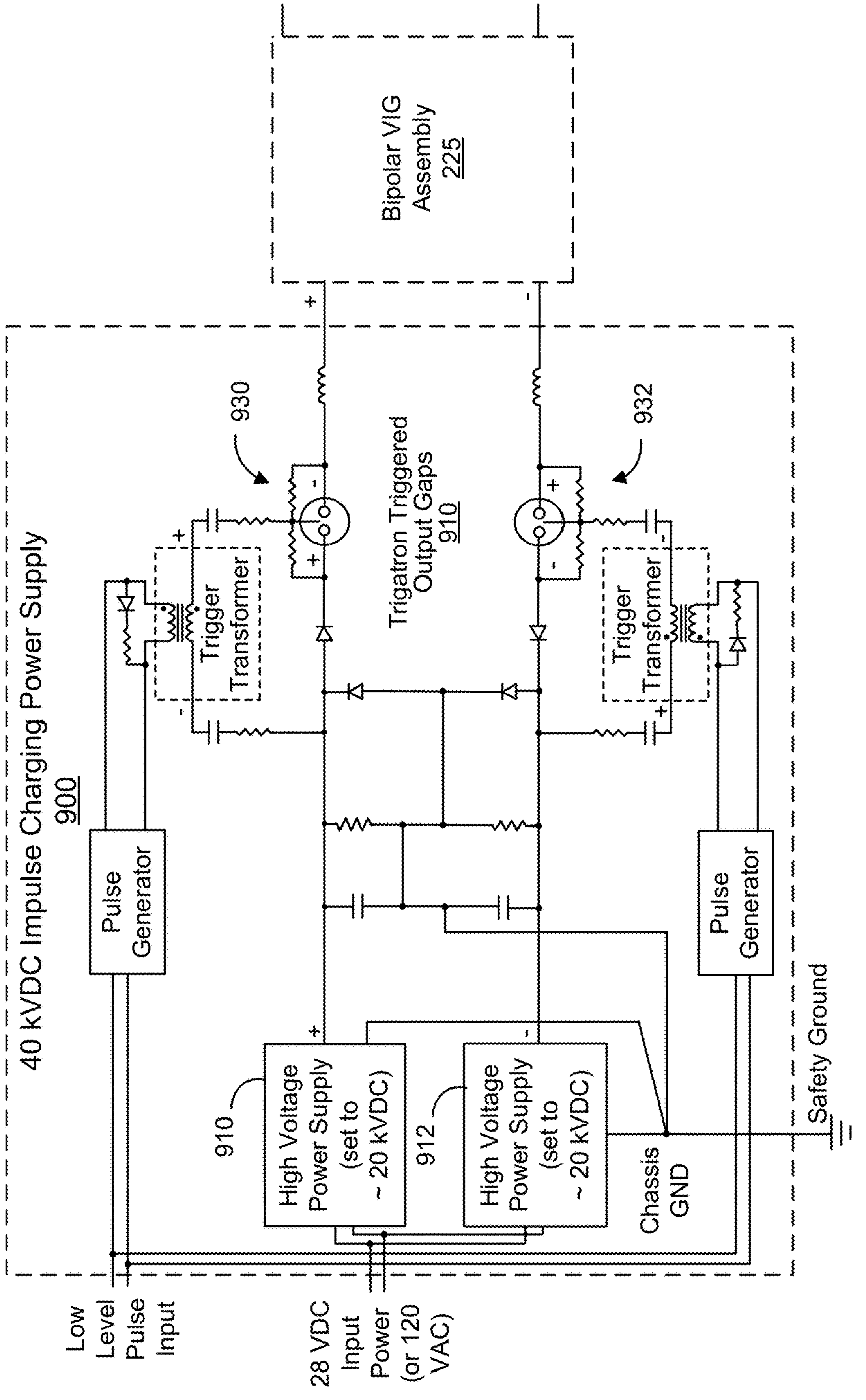
FIG. 9 is a simplified circuit schematic illustrating a 40 kVDC impulse charging power supply according to an alternative embodiment of the present invention.

FIG. 9 is a simplified circuit schematic illustrating a 40 kVDC impulse charging power supply according to an alternative embodiment of the present invention. As illustrated in FIG. 9, the high voltage impulse charging power supply 900 is implemented as a resonant charging supply with two triggered output gaps, i.e., first triggered output gap 930 on the positive leg and second triggered output gap 932 on the negative leg. This high voltage impulse charging power supply 900 utilizes two high voltage (HV) power supplies, i.e., first HV power supply 910 and second HV power supply 912, and switch devices/circuits to provide a bipolar (differential) high voltage impulse charging source for the bipolar VIG assembly 225, which can be considered as a capacitive load that can be charged using currents on the order of one to several kiloamps within a short timeframe, for example, 1 μs.

Figure 10:
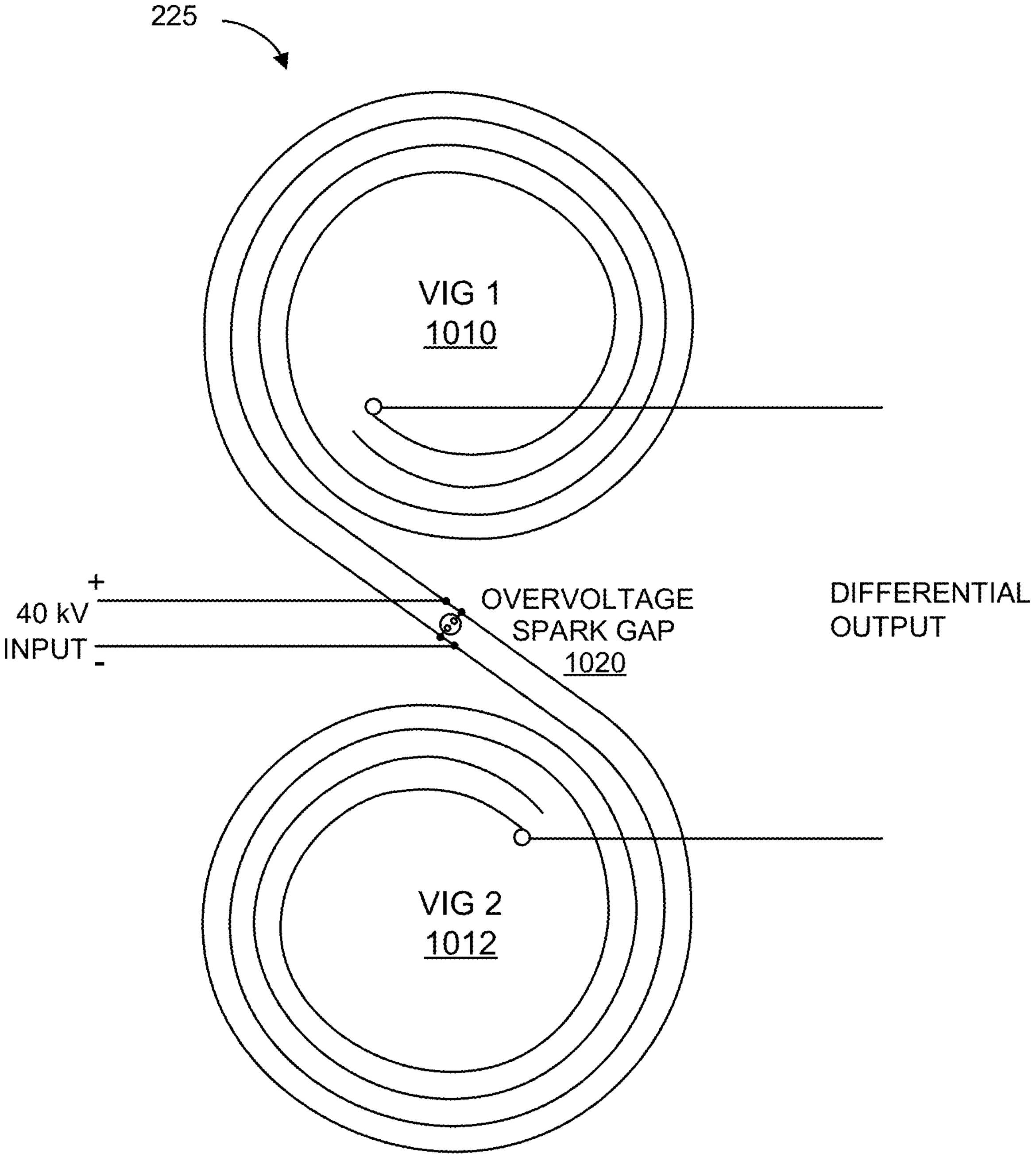
FIG. 10 is a schematic diagram illustrating a bipolar vector inversion generator (VIG) assembly according to an embodiment of the present invention.

FIG. 10 is a schematic diagram illustrating a bipolar vector inversion generator (VIG) assembly according to an embodiment of the present invention. As illustrated in FIG. 10, the bipolar VIG assembly includes first VIG 1010 and second VIG 1012 coupled to the output of the 40 kVDC power supply. An overvoltage spark gap 1020 is connected to the input and the two VIGs. The bipolar VIG assembly develops a high voltage differential output pulse.

The output from the 40 kVDC power supply pulse charges the bipolar VIG high voltage pulser, including two VIGs charged in parallel, within approximately 1 μs. The VIGs require less volumetric space than other pulser sources and are triggered simultaneously with a single spark gap. The output rise time of each VIG in some embodiments is ~6 ns with a small diameter VIG. A self-firing peaking spark gap assembly presents the output of the bipolar VIG as a high voltage, ~100 ps rise time, differential pulse to the antenna. In some embodiments, the bipolar VIG high voltage pulser stores up to 20 J of energy and produces a high voltage pulse on the order of 1 MV that is fed to the input of conical transverse electromagnetic (TEM) antenna horn plates within an impulse-radiating antenna (IRA) via an impedance matching structure and a peaking spark gap, resulting in a compact, highly integrated pulser/balanced antenna system.

Figure 11:
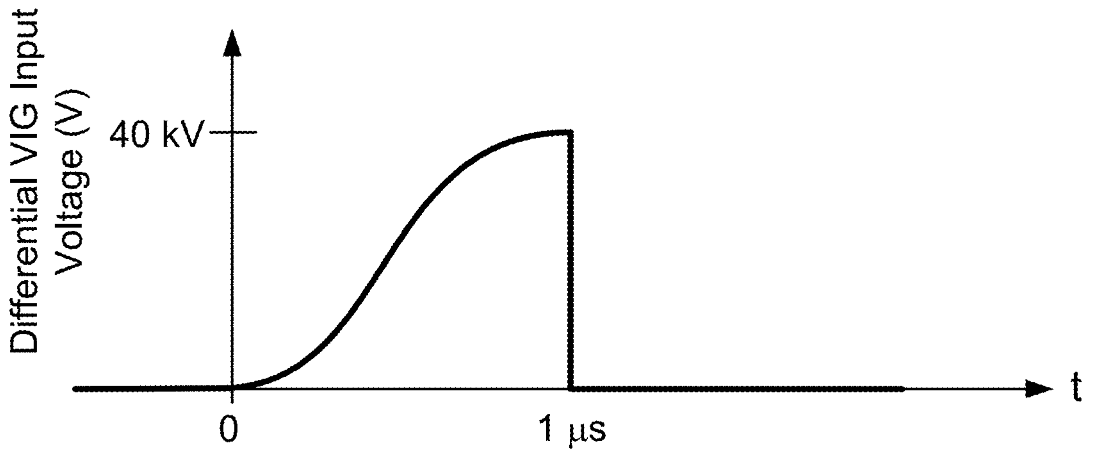
FIG. 11 is a simplified plot illustrating the output waveform of the impulse charging power supply according to an embodiment of the present invention.

FIG. 11 is a simplified plot illustrating the output waveform of the impulse charging power supply according to an embodiment of the present invention. In FIG. 11, the differential VIG input voltage is plotted as a function of time. The output of the impulse charging power supply provides the input to the bipolar VIG assembly 225 illustrated in FIG. 10. As shown in FIG. 11, the differential VIG input voltage rises to ~40 kV over a time period of ~1 μs and decreases rapidly at the end of the pulse as a result of the VIG overvoltage spark gap commutation.

Figure 12:
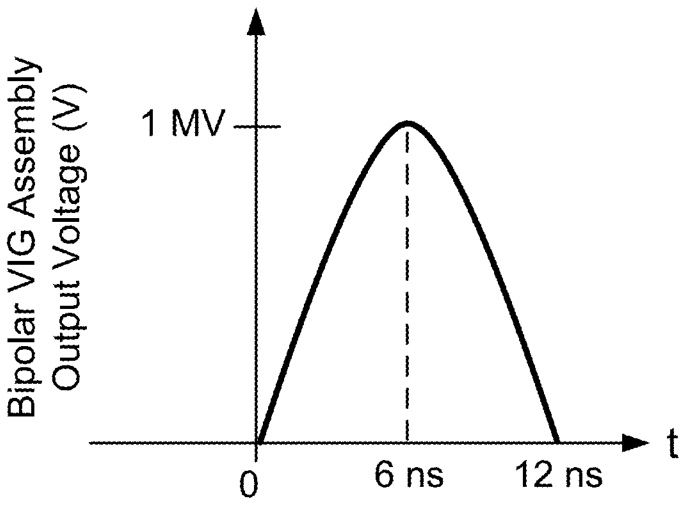
FIG. 12 is a simplified plot illustrating the output waveform of the bipolar VIG assembly according to an embodiment of the present invention.

FIG. 12 is a simplified plot illustrating the output waveform of the bipolar VIG assembly according to an embodiment of the present invention. In FIG. 12, the output voltage of the bipolar VIG assembly is plotted as a function of time. The output voltage reaches a maximum value, illustrated as occurring at a time of 6 ns in FIG. 12. As illustrated in FIG. 12, embodiments of the present invention, by using a bipolar VIG configuration, provide a balanced, high voltage pulse (e.g., on the order of hundreds of kV to several MV) with a short time period (on the order of 12 ns) that is provided to the peaking gap assembly via the impedance matching structure. The peak voltage associated with the output from the bipolar VIG assembly is dependent on the VIG input voltage, the VIG voltage multiplication efficiency, and the peaking gap commutation timing.

Figure 13:
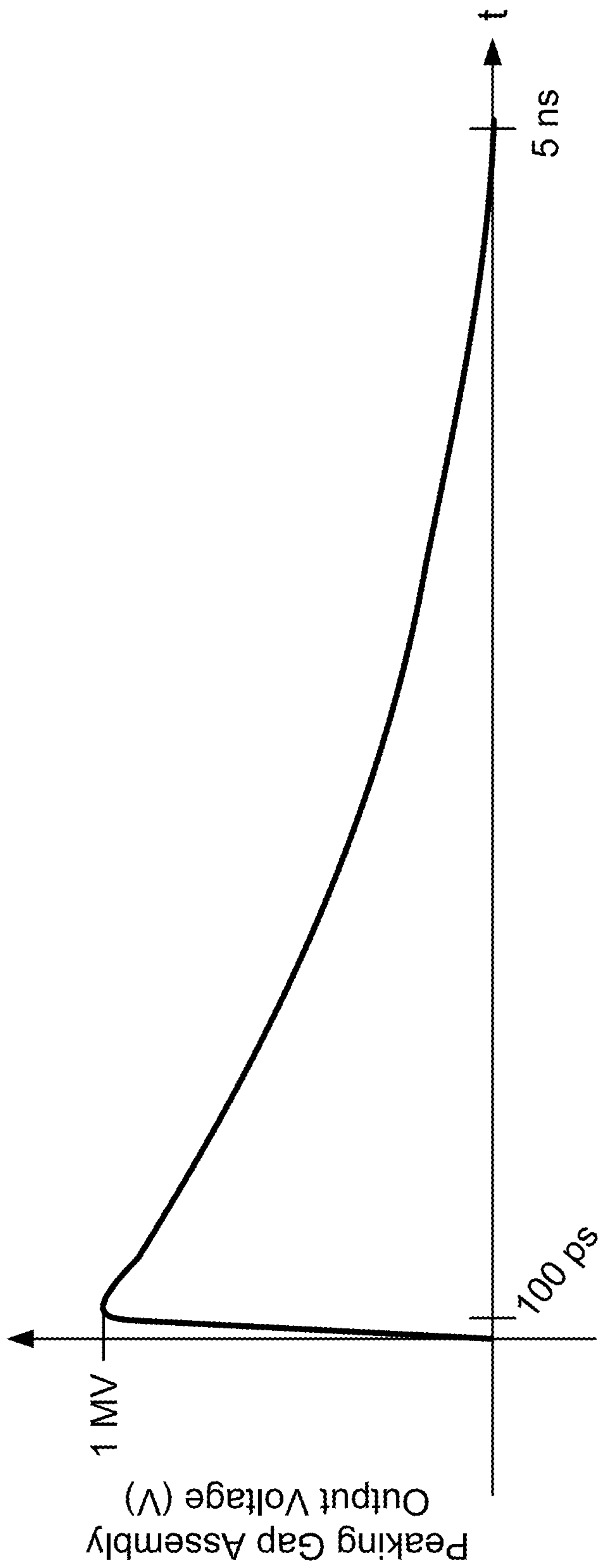
FIG. 13 is a simplified plot illustrating the output waveform of the peaking gap assembly according to an embodiment of the present invention.

FIG. 13 is a simplified plot illustrating the output waveform of the peaking gap assembly according to an embodiment of the present invention. In FIG. 13, the output voltage of the peaking gap assembly is plotted as a function of time. The output voltage of the peaking gap assembly is provided as an input to the antenna arm interfaces. As illustrated in FIG. 13, after pulse compression in the peaking gap assembly, the input to the antenna arm interfaces is a high voltage pulse (e.g., on the order of up to 1 MV) with a very short rise time (on the order of 100 ps) that results in UWB high peak radiated power from the antenna assembly.

Figure 14:
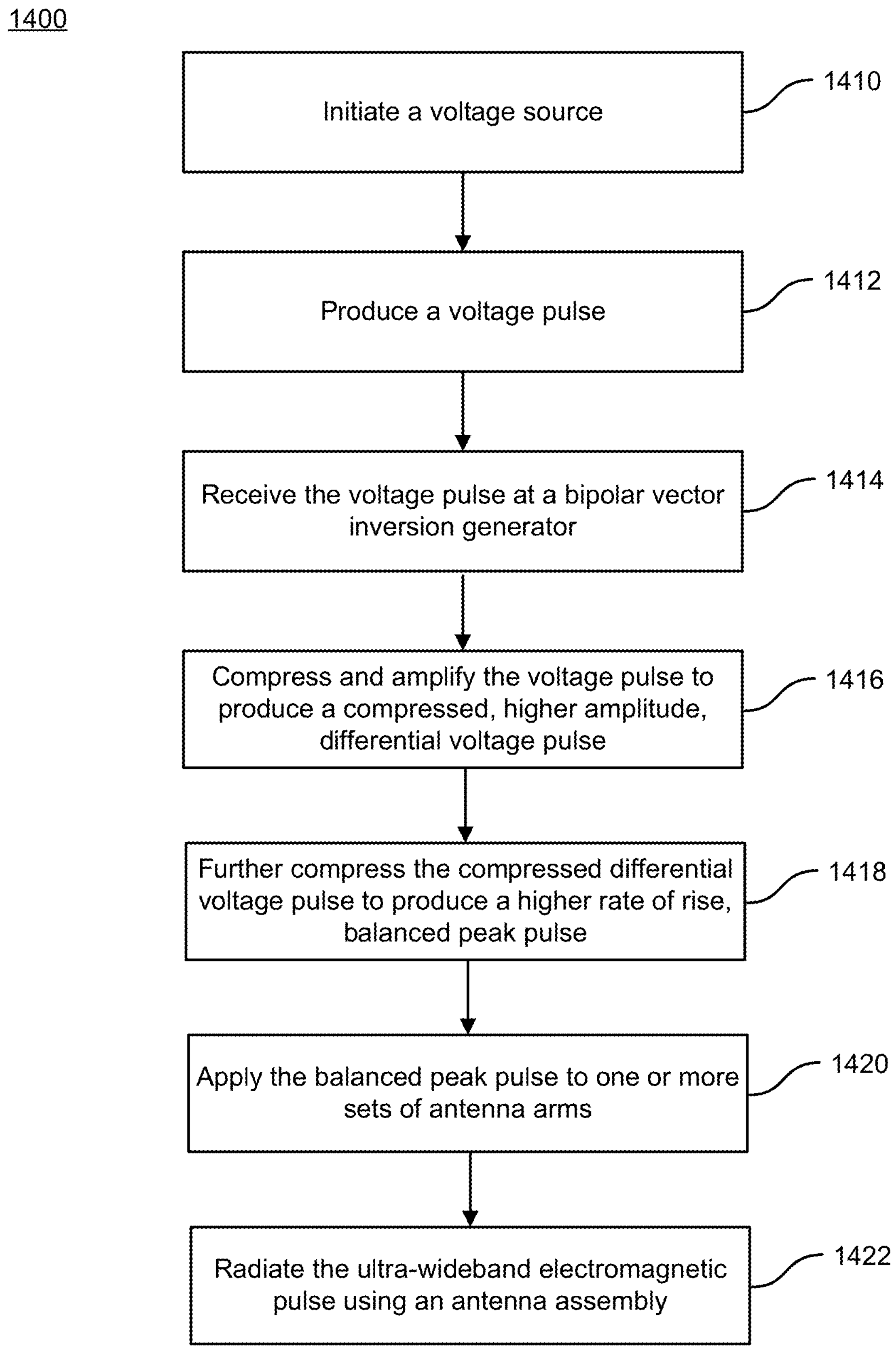
FIG. 14 is a simplified flowchart illustrating a method of generating an ultra-wideband high-power electromagnetic (HPEM) pulse according to an embodiment of the present invention.

FIG. 14 is a simplified flowchart illustrating a method of generating an ultra-wideband electromagnetic pulse according to an embodiment of the present invention. The method 1400 includes initiating a voltage source (1410), producing a voltage pulse using the voltage source (1412), and receiving the voltage pulse at a bipolar vector inversion generator (VIG) assembly (1414). The method also includes compressing and amplifying the voltage pulse using the bipolar VIG assembly to produce a compressed, differential voltage pulse (1416) and further compressing the compressed, differential voltage pulse using a peaking gap assembly to produce a balanced peak pulse (1418). The method further includes applying the balanced peak pulse to one or more sets of antenna arms (1420) and radiating the ultra-wideband electromagnetic pulse using an antenna assembly (1422).

In an embodiment, the one or more sets of antenna arms consists of two sets of antenna arms, each set of antenna arms consisting of two antenna arms. Each of the two antenna arms can include a highly conductive section and a resistive section. The length of the highly conductive section corresponds to a low frequency cutoff value for one or more sets of antenna arms. As examples, the compressed, differential voltage pulse can have a higher amplitude than the voltage pulse and the balanced peak pulse can have a higher rate of rise than the compressed, differential voltage pulse. The bipolar VIG assembly and the peaking gap assembly can be positioned in front of an antenna reflector of the antenna assembly.

In another embodiment, the bipolar VIG assembly comprises a first VIG and a second VIG. The peaking gap assembly can include two overvoltage gaps or a single overvoltage gap. The peaking gap assembly can be positioned closer to an antenna reflector of the antenna assembly than the bipolar VIG assembly.

It should be appreciated that the specific steps illustrated in FIG. 14 provide a particular method of generating an ultra-wideband electromagnetic pulse according to an embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of generating an ultra-wideband electromagnetic pulse, the method comprising:
- initiating a voltage source;
- producing a voltage pulse using the voltage source;
- receiving the voltage pulse at a bipolar vector inversion generator (VIG) assembly;
- compressing and amplifying the voltage pulse using the bipolar VIG assembly to produce a compressed, differential voltage pulse;
- further compressing the compressed, differential voltage pulse using a peaking gap assembly to produce a balanced peak pulse;
- applying the balanced peak pulse to one or more sets of antenna arms; and
- radiating the ultra-wideband electromagnetic pulse using an antenna assembly.

2. The method of claim 1 wherein the one or more sets of antenna arms consists of two sets of antenna arms, each set of antenna arms consisting of two antenna arms.

3. The method of claim 2 wherein each of the two antenna arms includes a highly conductive section and a resistive section.

4. The method of claim 3 wherein a length of the highly conductive section corresponds to a low frequency cutoff value for one or more sets of antenna arms.

5. The method of claim 1 wherein the compressed, differential voltage pulse has a higher amplitude than the voltage pulse and the balanced peak pulse has a higher rate of rise than the compressed, differential voltage pulse.

6. The method of claim 1 wherein the bipolar VIG assembly and the peaking gap assembly are positioned in front of an antenna reflector of the antenna assembly and the peaking gap assembly is positioned closer to the antenna reflector than the bipolar VIG assembly.

7. The method of claim 1 wherein the bipolar VIG assembly comprises a first VIG and a second VIG.

8. The method of claim 1 wherein the peaking gap assembly comprises two overvoltage gaps.

9. The method of claim 1 wherein the peaking gap assembly comprises a single overvoltage gap.

* * * * *